US011691503B2

(12) United States Patent
Heo et al.

(10) Patent No.: US 11,691,503 B2
(45) Date of Patent: Jul. 4, 2023

(54) VEHICLE DRIVE DEVICE WITH VARIABLE TRANSMISSION

(71) Applicant: SL Corporation, Daegu (KR)

(72) Inventors: Chun-Nyung Heo, Gyeongsan-si (KR); Jae-Seung Hong, Gyeongsan-si (KR); Min-Soo Kim, Gyeongsan-si (KR); Mi-Rae Do, Gyeongsan-si (KR); Sung-Jin Kim, Gyeongsan-si (KR)

(73) Assignee: SL Corporation, Daegu (KR)

( * ) Notice: Subject to any disclaimer, the term of this patent is extended or adjusted under 35 U.S.C. 154(b) by 169 days.

(21) Appl. No.: 17/139,400

(22) Filed: Dec. 31, 2020

(65) Prior Publication Data

US 2021/0199180 A1   Jul. 1, 2021

(30) Foreign Application Priority Data

Dec. 31, 2019   (KR) ........................ 10-2019-0179991
Dec. 31, 2019   (KR) ........................ 10-2019-0180018

(51) Int. Cl.
*B60K 17/14*       (2006.01)
*B62M 11/16*       (2006.01)
(Continued)

(52) U.S. Cl.
CPC ........ *B60K 17/145* (2013.01); *B60B 27/0021* (2013.01); *B60K 17/046* (2013.01); *B62M 11/16* (2013.01); *B60K 2007/0092* (2013.01)

(58) Field of Classification Search
CPC ................ B60K 17/145; B60K 17/046; B60K 2007/0092; B60K 2007/0038;
(Continued)

(56) References Cited

U.S. PATENT DOCUMENTS 2,227,801 A * 1/1941 Trofimov ................ F16H 3/724
                                                    475/5
4,014,224 A * 3/1977 Pitts .......................... F16H 1/32
                                                    475/180
(Continued)

FOREIGN PATENT DOCUMENTS

CN   103328247 A * 9/2013 ........... B60K 17/043
CN   106183765 A * 12/2016 .............. B60K 1/02
(Continued)

OTHER PUBLICATIONS

Translated CN-106183765-A (Year: 2022).*

*Primary Examiner* — James A Shriver, II
*Assistant Examiner* — Ian Bryce Shelton
(74) *Attorney, Agent, or Firm* — United One Law Group LLC; Kongsik Kim; Jhongwoo Peck

(57) ABSTRACT

A vehicle drive device with a variable transmission includes a first driving module that provides a driving force, a second driving module that controls a transmission ratio, a reduction gear part comprising a first sun gear, a second sun gear, and a planetary gear provided inside the second driving module, and an output part connected to one of the first sun gear, the second sun gear, and the planetary gear. In particular, the first driving module is connected to another one of the first sun gear, the second sun gear, and the planetary gear that is not connected to the output part.

10 Claims, 22 Drawing Sheets

(51) Int. Cl.
*B60K 17/04* (2006.01)
*B60B 27/00* (2006.01)
*B60K 7/00* (2006.01)

(58) Field of Classification Search
CPC .. B60K 7/0007; B60B 27/0021; B62M 11/16; F16H 3/724
See application file for complete search history.

(56) References Cited

U.S. PATENT DOCUMENTS

| | | | | |
|---|---|---|---|---|
| 10,625,594 | B2* | 4/2020 | Yamamoto | F16H 3/728 |
| 11,268,585 | B2* | 3/2022 | Matsunaga | F16D 67/02 |
| 11,358,468 | B2* | 6/2022 | Wang | H02K 7/1846 |
| 2013/0217529 | A1* | 8/2013 | Gunji | B60K 1/02 384/537 |
| 2013/0292994 | A1* | 11/2013 | Yukishima | B60K 7/0007 301/6.5 |
| 2015/0028658 | A1* | 1/2015 | Friedmann | B60K 7/0007 301/6.5 |
| 2017/0368931 | A1* | 12/2017 | Tesar | B60K 17/046 |
| 2018/0015823 | A1* | 1/2018 | Wu | B60K 7/0007 |
| 2019/0084407 | A1* | 3/2019 | Takemoto | H02K 5/15 |
| 2019/0190349 | A1* | 6/2019 | Ito | H02K 9/19 |
| 2020/0244138 | A1* | 7/2020 | Fröhlich | F16H 3/006 |

FOREIGN PATENT DOCUMENTS

| | | | | | |
|---|---|---|---|---|---|
| CN | 107215196 | A | * | 9/2017 | |
| CN | 109398069 | A | * | 3/2019 | |
| CN | 110385979 | A | * | 10/2019 | B60K 17/046 |
| EP | 2632031 | A2 | * | 8/2013 | H02K 7/102 |
| JP | 2012165577 | A | * | 8/2012 | H02K 16/00 |
| JP | 2014218197 | A | * | 11/2014 | |
| KR | 20180081858 | A | * | 7/2018 | |
| WO | WO-2016080493 | A1 | * | 5/2016 | B60K 7/00 |

* cited by examiner

<Output Torque>

<Output Torque>

VEHICLE DRIVE DEVICE WITH VARIABLE TRANSMISSION

CROSS-REFERENCE TO RELATED APPLICATIONS

This application claims priority from Korean Patent Application No. 10-2019-0179991 filed on Dec. 31, 2019 and Korean Patent Application No. 10-2019-0180018 filed on Dec. 31, 2019, which applications are incorporated herein by reference in their entirety.

BACKGROUND

1. Field of the Disclosure

The present disclosure relates to a vehicle drive motor, and more particularly, to a vehicle drive device having a variable transmission capable of achieving the high power and miniaturization of a transmission control device.

2. Description of the Related Art

Due to the depletion of fossil fuels, future transportation means, such as electric vehicles, that drive motors using electrical energy stored in batteries are being developed instead of vehicles using fossil fuels such as gasoline and diesel.

Electric vehicles are classified into a full electric vehicle, which drives a motor using only electrical energy stored in a rechargeable battery, a solar cell vehicle that drives a motor using photovoltaic cells, a fuel cell vehicle that drives a motor using fuel cells based on a hydrogen fuel, and a hybrid vehicle that uses both an engine and a motor by driving the engine using a fossil fuel and driving the motor using electricity.

Among the transportation means using electricity as a power source as described above, electric vehicles, plug-in hybrid cars, and fuel cell vehicles typically do not use a large single motor but use an in-wheel motor system that employs distributed control using each motor installed in each wheel.

Such an in-wheel motor system may be implemented by integrating a drive motor, a brake device, a bearing, a reducer, etc. into a wheel. Such an in-wheel motor system has technical advantages in terms of high energy efficiency compared to a system driven by one large-capacity motor, the ease of construction of an electric four-wheel drive system, and improved vehicle driving stability due to independent driving control of left and right wheels.

In general, an in-wheel motor system includes a motor that generates a driving force, a cooling device that cools the motor, a reducer that transfers the driving force of the motor to a wheel, a brake device that generates a braking force, a steering device that changes the direction of the vehicle, a suspension that supports the wheel of the vehicle, and the like, and such multiple components are integrated and arranged in the wheel. In general, an in-wheel motor system as described above converts electrical energy into a rotational driving force via a stator and a rotor of a motor, and the rotational driving force is reduced or torque is multiplied via a reducer and then transferred to a hub to rotate the wheel, such that the power is transmitted in this order.

In addition, a reducer for reducing the rotational speed of a motor is a single reducer and uses a counter gear and a planetary gear. The reducer has a structure in which the rotational speed is reduced via the counter gear first, is then reduced via the planetary gear, and is transferred to a hub. Therefore, typically, the planetary gear for the second reduction is housed in a hub bearing, and thus the complex planetary gear is placed in a hub. Accordingly, a hub case is placed outside the planetary gear for the purpose of wheel drive or load support. In this case, the fabrication and design of a special hub that is customized to a drive motor system are required, and conventional wheels cannot be used in such drive motor system. Further, since the second reduction by the planetary gear increases the torque, it is necessary to increase the volume of the planetary gear, which has a complex structure. In order to obtain sufficient structural rigidity, the width, outer diameter, etc. are designed to be large, which may cause an increase in cost.

In addition, when a single reducer is used, a high-capacity motor should be used to implement a high torque that is required for high initial driving or vehicle operation. Due to the limited torque band at the maximum RPM, the output torque is reduced upon instantaneous acceleration, which presents a limitation to the instantaneous acceleration.

A counter gear and a planetary gear, which are contact-type reducers that are driven by a contact, have limitations in that noise and heterogeneity are generated due to the contact of the gears, there is a limit to the endurance life, and lubricants should be regularly maintained to drive the contact-type gears. Further, since the motor of the in-wheel system is a single reducer, the motor becomes inoperable when the reducer fails, which causes serious vehicle problems related to driver safety. In addition, in order for a vehicle to implement a braking force, a hydraulic brake and a drive motor are mounted together in a limited space of a wheel, which poses a space limitation.

SUMMARY

The present disclosure is directed to providing a vehicle drive device with a variable transmission, the vehicle drive device being capable of designing a low motor capacity (i.e., volume) in a drive motor with respect to the output torque. The present disclosure is also directed to providing a vehicle drive device with a variable transmission, the vehicle drive device being capable of implementing consistent high-band torques through the lowest and highest RPMs. The present disclosure is also directed to providing a vehicle drive device with a variable transmission, the vehicle drive device being capable of reducing noise and heterogeneity by applying a non-contact-type reducer rather than a contact-type reducer. The present disclosure is also directed to providing a vehicle drive device with a variable transmission, the vehicle drive device being capable of saving an arrangement space and achieving weight-reduction and miniaturization. The present disclosure is also directed to providing a drive device with a variable transmission, the drive device being capable of adjusting a speed ratio and increasing energy consumption efficiency while maintaining the constant speed.

It should be noted that objects of the present disclosure are not limited to the above-described objects, and other objects of the present disclosure will be apparent to those skilled in the art from the following descriptions.

According to an aspect of an exemplary embodiment, a vehicle drive device with a variable transmission may include a first driving module that provides a driving force; a second driving module that controls a transmission ratio; a reduction gear part comprising a first sun gear, a second sun gear, and a planetary gear provided inside the second driving module; and an output part connected to one of the first sun gear, the second sun gear, and the planetary gear.

Further, the first driving module may be connected to another one of the first sun gear, the second sun gear, and the planetary gear that is not connected to the output part.

The second sun gear may have a different number of teeth from the first sun gear and may be engaged with the planetary gear. The vehicle drive device may further include a housing that accommodates the first driving module and the second driving module; and a shaft that receives rotation of the first driving module.

The planetary gear may be configured to rotate by being connected through a plurality of vertical shafts disposed around the shaft, and by being included in the vertical shafts and a circular carrier rotating around the shaft. The first sun gear may be meshed with the planetary gear on an outer surface of one end of the output part, and the second sun gear may be provided inside the second driving module, disposed above the first sun gear, and meshed with the planetary gear.

The housing may include a first body accommodating the first driving module, and the first driving module may include a first stator comprising a first stator core fixed to the first body and a plurality of first coils placed along an inner circumference of the first stator core; and a first rotor seated inside the first stator, coupled to the first stator to rotate around the shaft. A first magnet corresponding to the first coil may be mounted in the first rotor.

When an electric current is applied to the first coil, a magnetic field may be formed in the first stator, and the first rotor may rotate due to the first magnet interacting with the magnetic field, and the rotation of the first rotor may be applied to a reduction part and may be output via the output part to rotate the carrier to which the planetary gear is coupled through the shaft.

The housing may include a second body accommodating the second driving module, and the second driving module may include a second stator comprising a second stator core fixed to the second body and a plurality of second coils placed along an inner circumference of the second stator core; and a second rotor seated inside the second stator, coupled to the second stator to rotate around the shaft and the output part. A second magnet corresponding to the second coil may be mounted in the second rotor.

The second rotor may further include a rotating housing coupled to an inner surface of the second rotor to rotate together with the second rotor, and the second sun gear may be provided in the rotating housing.

When an electric current is applied to the second driving module, the second rotor corresponding to a rotating body of the second driving module may rotate, and the rotation of the second rotor may be applied to a reduction part and may be output via the output part, and the planetary gear may rotate along with the rotation of the second sun gear coupled to the second rotor.

The reduction gear part may generate a reduction ratio via the carrier that takes an input using the rotation of the first driving module, the second sun gear that rotates based on the rotation of the second rotor due to the rotation of the carrier, and the first sun gear that implements an output by rotating due to the rotation of the planetary gear that rotates while engaged with the second sun gear.

According to an aspect of another exemplary embodiment, a vehicle drive device with a variable transmission may include a first driving module that provides a driving force; a second driving module that controls a transmission ratio; a transmission part comprising a first rotor, a second rotor, and a third rotor provided inside the second driving module; and an output part connected to one of the first rotor, the second rotor, and the third rotor. The first driving module may be connected to another one of the first rotor, the second rotor, and the third rotor that is not connected to the output part, and the second driving module may be connected to yet another one of the first rotor, the second rotor, and the third rotor that is connected to neither the output part nor the first driving module.

The vehicle drive device may further include a housing in which the first driving module and the second driving module are accommodated; a shaft part that receives rotation of the first driving module, and forms a rotation axis of the second driving module; and an output part that receives the rotation and outputs a rotational force changed in speed by the transmission part.

The housing may include a first body part comprising a first body having one surface open in a first direction and a first cover configured to cover the first body; and a second body part comprising a second body located on the other surface of the first body and opened in a second direction opposite to the first direction and a second cover.

The first driving module may include a first stator comprising a first stator core fixed to the first body and a plurality of first coils placed along an inner circumference of the first stator core; and a first rotor seated inside the first stator, coupled to the first stator to rotate around the shaft part. A first magnet corresponding to the first coil may be mounted in the first rotor.

The second driving module may include a second stator comprising a second stator core fixed to the second body and a plurality of second coils placed along the inner circumference of the second stator core; and a second rotor seated inside the second stator, coupled to the second stator to rotate around the shaft part. A second magnet corresponding to the second coil may be mounted in the second rotor.

The transmission part may include a third rotor inserted into and coupled to the shaft part, configured to rotate along with the rotation of the shaft part. A third magnet may be mounted in the third rotor; a fourth magnet may be provided along an inner surface of the first rotor; and a second rotor may have a harmonic modulator of a magnetic body rotating at a rate that changes depending on magnetic flux transferred between the first rotor and the third rotor.

The vehicle drive device may further include a control unit comprising a first inverter for controlling the first driving module and a second inverter for controlling the second driving module.

A first hole may be formed in the other surface of a first body, a second hole connected to the first hole may be formed in one surface of the second body, and a second exposure hole through which the output part may be exposed is formed in a second cover.

Further, a first bearing may be provided on both sides of a first region coupled to the first rotor in a first shaft, a second bearing may be provided on both sides of a second region coupled to the third rotor in a second shaft, and a third bearing may be provided between the second rotor and the harmonic modulator of the magnetic body and between the second rotor and the second body.

The vehicle drive device may operate in a first mode in which both of the first driving module and the second driving module are driven; or in a second mode in which one of the first driving module and the second driving module is driven and the other is fixed.

BRIEF DESCRIPTION OF THE DRAWINGS

The above and other aspects and features of the present disclosure will become more apparent by describing exemplary embodiments thereof in detail with reference to the attached drawings, in which.

DETAILED DESCRIPTION

Figure 1:
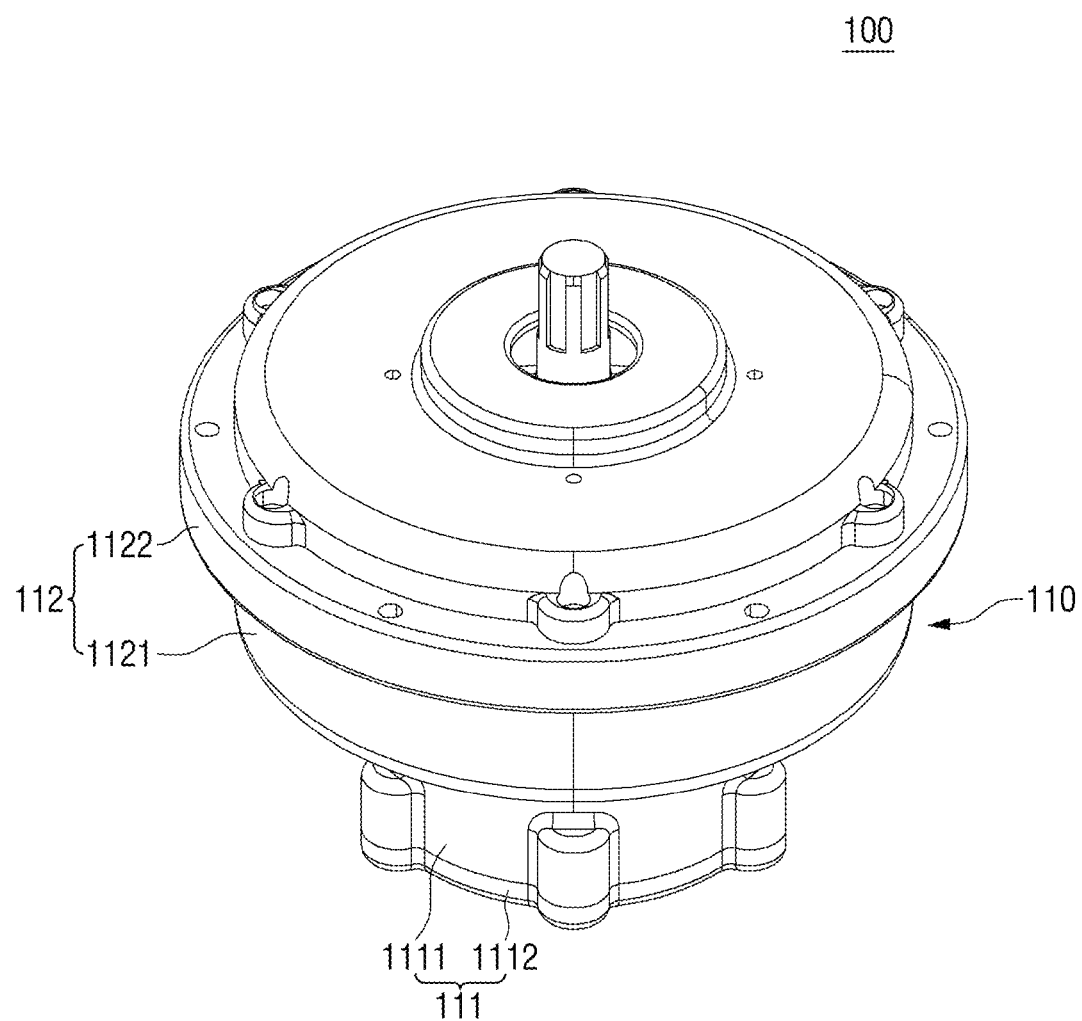
FIG. 1 is a schematic external perspective view of a vehicle drive device with a variable transmission according to an exemplary embodiment of the present disclosure.

Advantages and features of the disclosure and methods to achieve them will become apparent from the descriptions of exemplary embodiments herein below with reference to the accompanying drawings. However, the inventive concept is not limited to exemplary embodiments disclosed herein but may be implemented in various ways. The exemplary embodiments are provided for making the disclosure of the inventive concept thorough and for fully conveying the scope of the inventive concept to those skilled in the art. It is to be noted that the scope of the disclosure is defined only by the claims. Like reference numerals denote like elements throughout the descriptions.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Terms used herein are for illustrating the exemplary embodiments rather than limiting the present disclosure. As used herein, the singular forms are intended to include plural forms as well, unless the context clearly indicates otherwise. Throughout this specification, the word "comprise" and variations such as "comprises" or "comprising," will be understood to imply the inclusion of stated elements but not the exclusion of any other elements.

Hereinafter, exemplary embodiments of the present disclosure will be described in detail with reference to the accompanying drawings.

Figure 2:
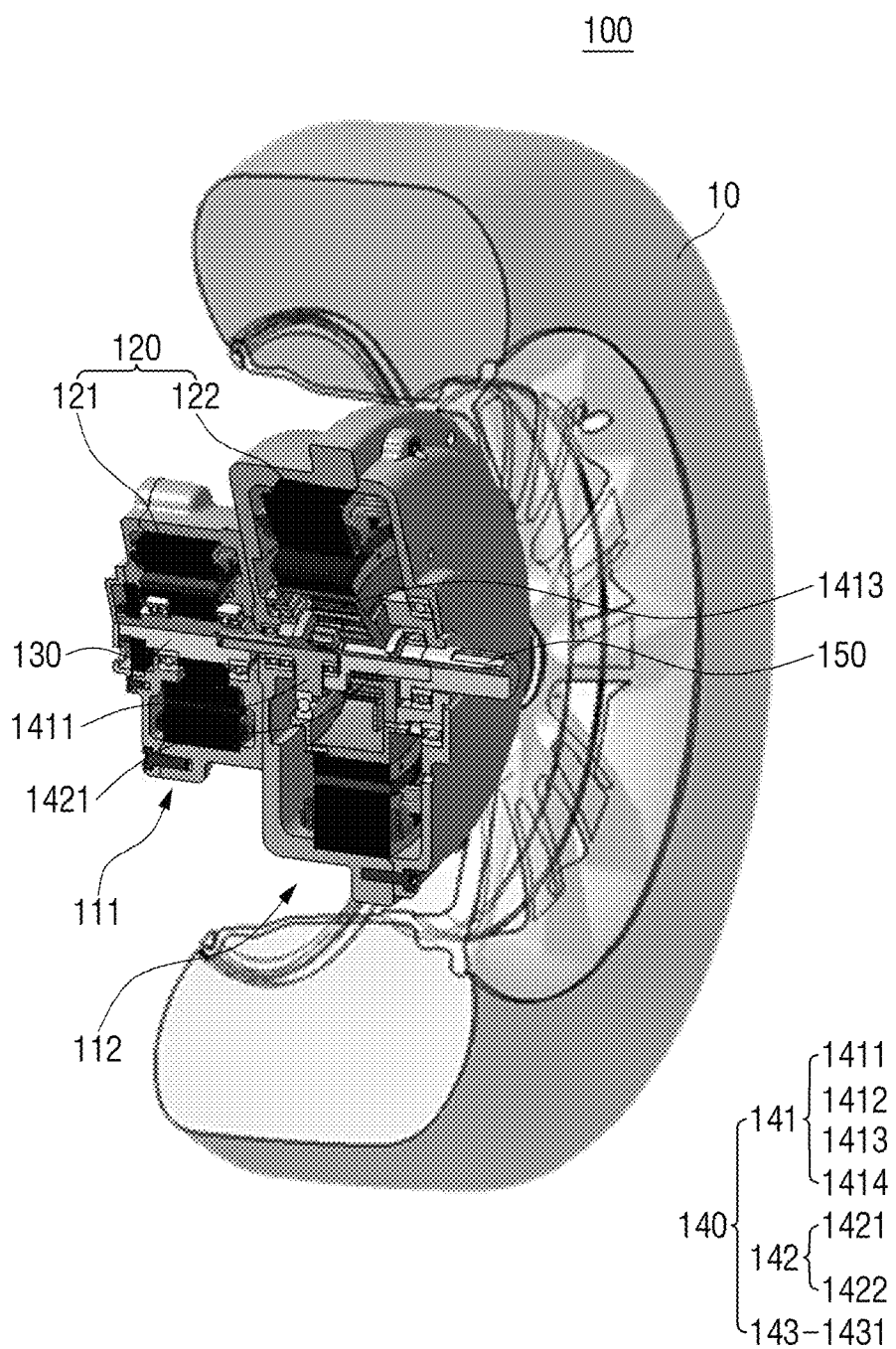
FIG. 2 is a schematic partial sectional internal perspective view of the vehicle drive device with the variable transmission installed in a wheel according to an exemplary embodiment of the present disclosure.
Figure 3:
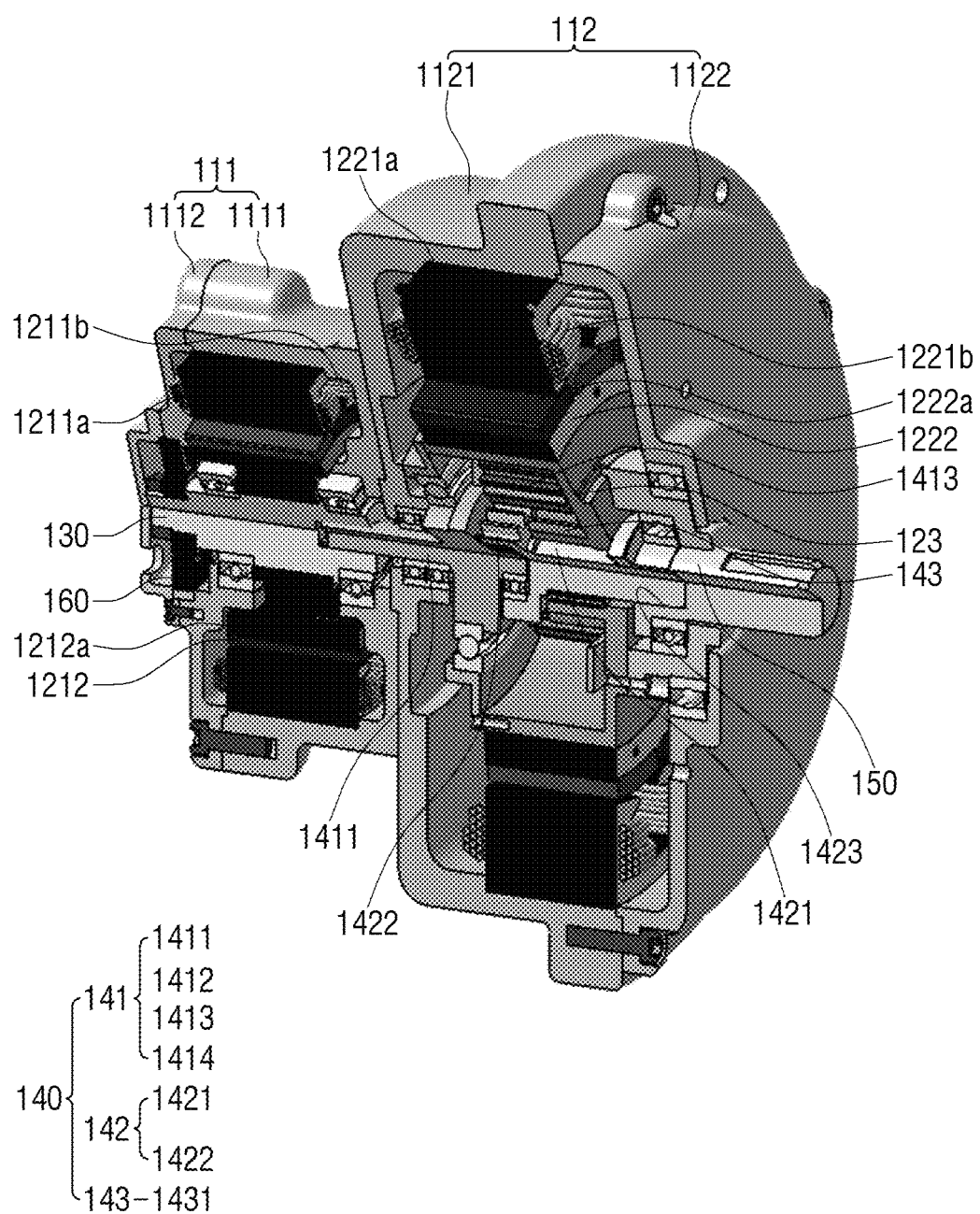
FIG. 3 is a sectional perspective view showing internal coupling in the vehicle drive device with the variable transmission according to an exemplary embodiment of the present disclosure.
Figure 4:
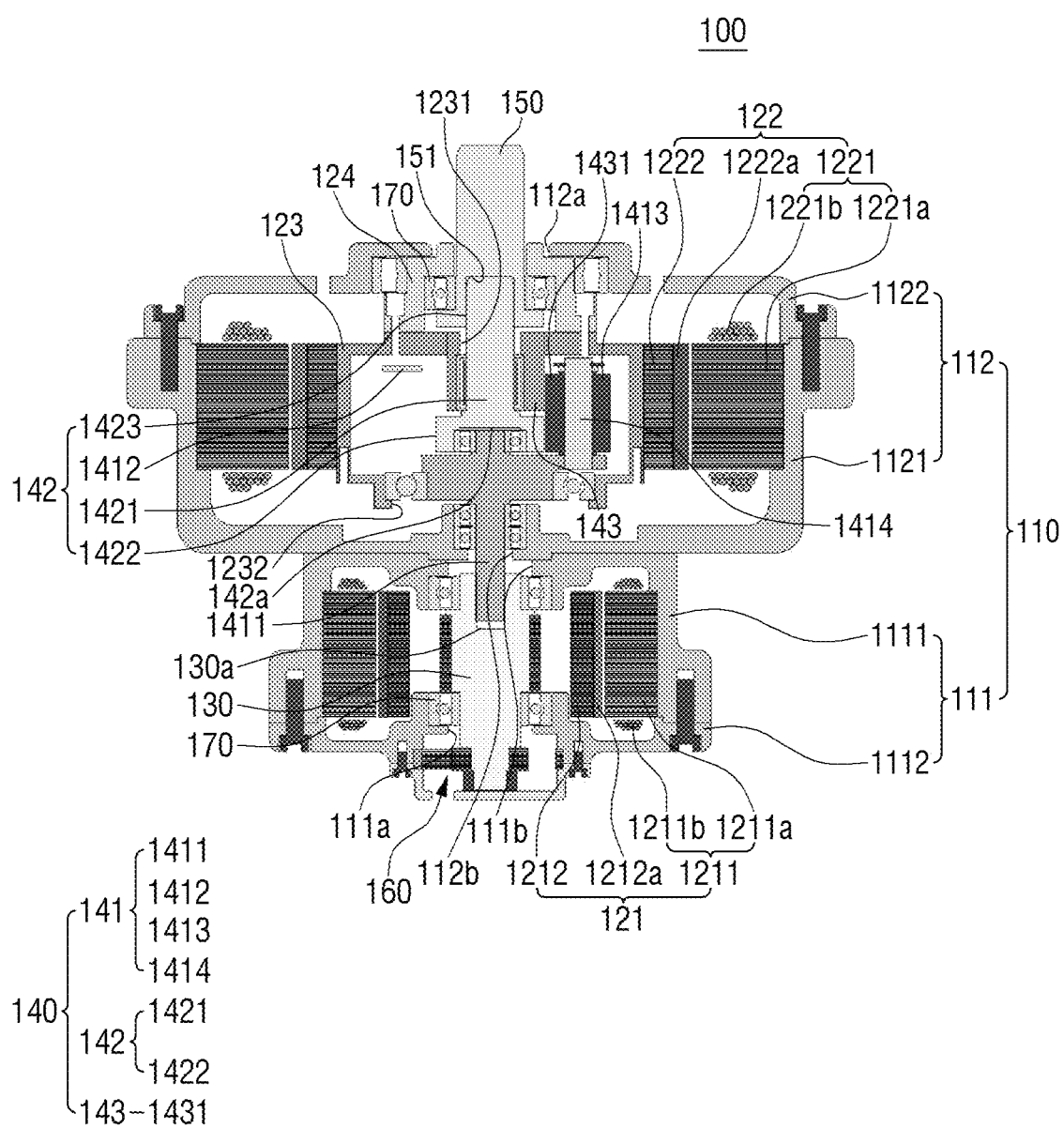
FIG. 4 is a sectional view showing internal coupling of the vehicle drive device with the variable transmission according to an exemplary embodiment of the present disclosure.

FIG. 1 is a schematic external perspective view of a vehicle drive device 100 with a variable transmission according to an exemplary embodiment of the present disclosure. FIG. 2 is a schematic partial sectional internal perspective view of the vehicle drive device 100 with the variable transmission installed in a wheel according to an exemplary embodiment of the present disclosure. FIG. 3 is a sectional perspective view showing internal coupling in the vehicle drive device 100 with the variable transmission according to an exemplary embodiment of the present disclosure. FIG. 4 is a sectional view showing internal coupling of the vehicle drive device 100 with the variable transmission according to an exemplary embodiment of the present disclosure.

Referring to FIGS. 1 to 4, the vehicle drive device 100 with the variable transmission according to an exemplary embodiment of the present disclosure may include a housing 110, a driving part 120, a shaft 130, a reduction gear part 140, and an output part 150.

The housing 110 may be accommodated inside the wheel 10 and provided to house the driving part 120, the reduction gear part 140, and the output part 150 therein. The housing 110 may include a first body part 111 and a second body part 112.

The first body part 111 may include a first body 1111 and a first cover 1112. One surface of the first body 1111 may be open in a first direction, and a space capable of accommodating the shaft 130 and a first driving module 121, which will be described below, may be formed inside the first body 1111. The first cover 1112 may be coupled to the open surface of the first body 1111 to cover the space of the first body 1111. Also, the other surface of the first body 1111 may be coupled to one surface of the second body 1121, which will be described below. A first connection hole 111b may be formed on the other surface of the first body 1111, and specifically, at the center of the other surface of the first body 1111 to connect to a second connection hole formed in a space of the second body 1121, and specifically, on one surface of the second body 1121.

A first exposure hole 111a for exposing an end portion of the shaft 130, which will be described below, may be formed in the first cover 1112. Also, a resolver module 160 for detecting a rotation angle of the shaft 130 exposed outward from the first cover 1112 may be further provided on an outer surface of the first cover 1112.

The resolver module 160 may include a permanent magnet provided along an outer surface of the shaft 130 and a Hall sensor spaced apart from the permanent magnet and provided along the circumference of the shaft 130. The Hall sensor may detect the permanent magnet and may detect the number of rotations of the shaft 130. However, the resolver module 160 is not limited thereto, and any changes or modifications are also possible as long as it is capable of detecting a rotation angle via the rotation of the shaft 130.

The second body part 112 may include a second body 1121 and a second cover 1122. The second body 1121 may be provided on the other surface of the first body 1111 and may be open in a second direction opposite to the first direction. Accordingly, while the one surface of the first body 1111 and the other surface of the second body 1121 are combined with each other, the other surface of the first body 1111 and the one surface of the second body 1121 may be open. A space may be formed inside the second body 1121 to accommodate a second driving module 122, which will be described below, the reduction gear part 140, and the output part 150. The second cover 1122 may be coupled to the open surface of the second body 1121 to cover the space of the second body 1121.

The second connection hole 112b may be formed in one surface of the second body 1121 and, specifically, at the center of the surface of the second body 1121 to connect to the first connection hole 111b.

The shaft 130 and the first driving module 121 may be housed in the first body 1111, but the reduction gear part 140, which will be described below, as well as the second driving module 122 and the output part 150 may be further provided in the second body 1121. Accordingly, the second body 1121 may have a greater diameter than the first body 1111.

A second exposure hole 112a, through which the output part 150 is to be exposed, may be formed in the second cover 1122 and, specifically, at the center of the second cover 1122.

According to an exemplary embodiment of the present disclosure, main shafts 130, 1411, and 1421 may be provided inside the housing 110 and configured to form a central axis and a rotation axis. More specifically, the main shaft may include the shaft 130, a transfer shaft 1411, and an extension shaft 1421. However, according to the present disclosure, the main shafts 130, 1411, and 1421 may have a structure in which the shaft 130, the transfer shaft 1411, and the extension shaft 1421 are implemented as separate pieces and coupled to each other, but the shaft 130 and the transfer shaft 1411 may be formed as an integrated piece, and the extension shaft 1421 may be formed integrally with the output part 150.

The shaft 130 may be provided in the first body 1111 and may be rotated by receiving the rotation of the first driving module 121 while forming a rotation axis of the first driving module 121. One end of the shaft 130 may pass through the first exposure hole 111a of the first cover 1112, and the other end of the shaft 130 may be connected to the transfer shaft 1411 to transfer the rotational force.

In other words, the shaft 130 may be disposed at the center of the first body 1111 to form an axis and, specifically, the rotation axis of the first driving module 121, which will be described below, and may be rotated by receiving the rotation of the first driving module 121. Specifically, the shaft 130 may be inserted into a hollow of a first rotor 1212 of the first driving module 121, which will be described below, to rotate along with the rotation of the first rotor 1212. Further, one end of the shaft 130 may be provided on the first cover 1112 side.

A recess 130a may be formed in one surface of the other end of the shaft 130, and an end portion of the transfer shaft 1411, which will be described below, may be inserted into and coupled to the recess 130a of the shaft 130. One end of the shaft 130 may protrude outward from the first cover 1112 through the first exposure hole 111a of the first cover 1112. The configurations of the transfer shaft 1411 and the extension shaft 1421 will be described in detail when the reduction gear part 140 is described.

The driving part 120 according to an exemplary embodiment of the present disclosure may be provided in each of the first body part 111 and the second body part 112. Specifically, the driving part 120 according to an exemplary embodiment of the present disclosure may include a first driving module 121 and a second driving module 122.

The first driving module 121 may be accommodated inside the first body 1111 to rotate the shaft 130 around the rotational axis. The first driving module 121 may be operated in a first driving mode, which is used for applying a driving force to a vehicle. The second driving module 122 may be accommodated inside the second body 1121 and may be operated in a second driving mode, which is used for forming a variable speed ratio or a variable output ratio based on an applied electric current.

The configurations of the first driving module 121 and the second driving module 122 will be described below. The reduction gear part 140 according to an exemplary embodiment of the present disclosure may be provided in the second driving module 122, and the reduction gear part 140 may receive the rotational motion of the first driving module 121 via the rotation of the shaft 130 and receive the rotational motion of the second driving module 122 via the rotation of a second sun gear 1431, which will be described below, to control a reduction ratio of rotational output.

The configuration of the reduction gear part 140 will be described in detail below with reference to FIGS. 6 and 7. The output part 150 according to an exemplary embodiment of the present disclosure may be exposed to one side of the housing 110, and specifically, to the other surface of the second body part 112. Further, the output part 150 may receive and output a rotational force that is controlled (e.g., reduced) by the reduction gear part 140 having received a rotational force from at least one of the first driving module 121 or the second driving module 122.

The output part 150 according to an exemplary embodiment of the present disclosure may be connected to one of a first sun gear 1422, the second sun gear 1431, or a planetary gear 1413 to implement an output that is reduced by a predetermined transmission ratio. In an exemplary embodiment of the present disclosure, a structure in which the output part 150 is connected to the planetary gear 1413 through the extension shaft 1421 may be described as an example. However, as described above, the output part 150 may be integrally formed with the extension shaft 1421, and in this case, the output part 150 may be connected to one of the first sun gear 1422, the second sun gear 1431, and the planetary gear 1413.

Figure 5:
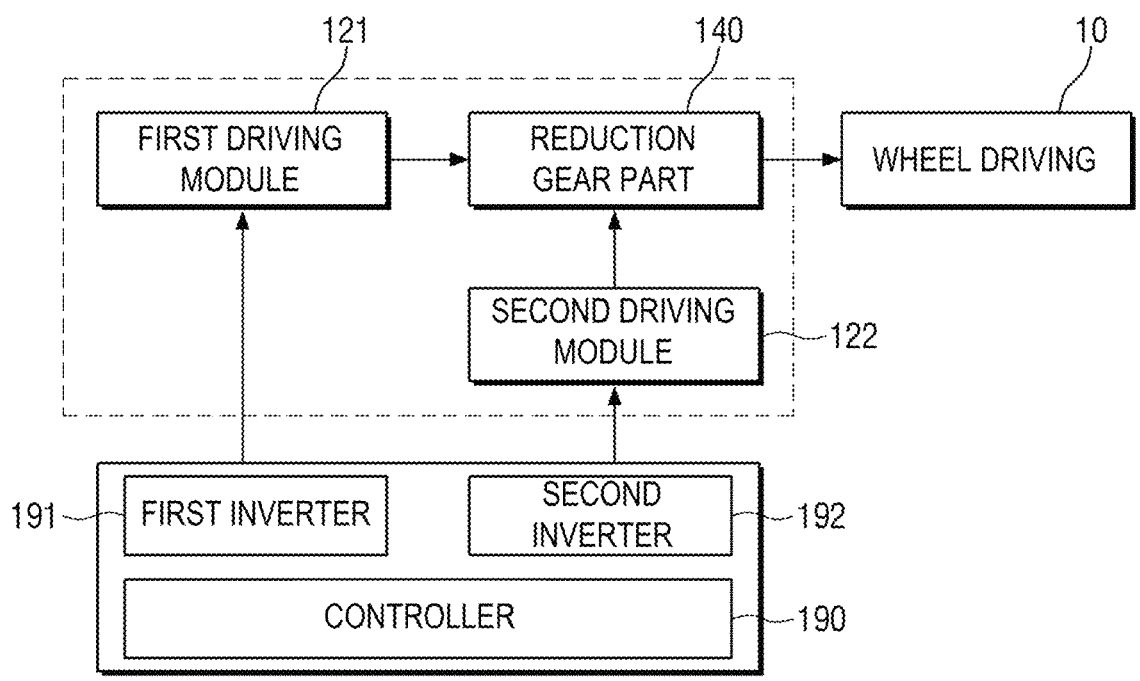
FIG. 5 is a block diagram illustrating wheel driving in the vehicle drive device with the variable transmission according to an exemplary embodiment of the present disclosure.

FIG. 5 is a block diagram illustrating wheel driving in the vehicle drive device 100 with the variable transmission according to an exemplary embodiment of the present disclosure.

Referring to FIG. 5, the first driving module 121 and the second driving module 122 may be controlled by being connected to a first inverter 191 and a second inverter 192 of the control unit 190, respectively. In the case of the drive device 100 provided as described above, the first driving module 121 may be driven through the driving control of the first driving module 121 in the first inverter 191 of the control unit 190, and the driving of the first driving module 121 may adjust a speed ratio, that is, control a transmission ratio via the reduction gear part 140.

Further, the second driving module 122 may be driven via the driving control of the second driving module 122 in the second inverter 192 of the control unit 190, and the driving of the second driving module 122 may cause a change in speed via the reduction gear part 140.

The motion (i.e., the rotational motion) of at least one of the first driving module 121 or the second driving module 122 may be applied to the reduction gear part 140, and the motion may be changed in speed by the reduction gear part 140 and may be output via the output part 150 to drive a wheel 10 according to a function that is suitable, for example, for initial driving or high-speed operation.

Here, referring to FIG. 4, the first driving module 121 (hereinafter also referred to as an "input motor") according to an exemplary embodiment of the present disclosure may provide a driving force for a vehicle. As described above, the first driving module 121 may be housed in the first body part 111. The first driving module 121 may be fixedly coupled to the shaft 130 using the shaft 130 as a rotation axis. Thus, when the first driving module 121 rotates about the shaft 130, the shaft 130 may form a rotation axis of the first driving module 121 and thus may rotate together with the first driving module 121.

The first driving module 121 may include a first stator 1211 and a first rotor 1212. The first stator 1211 may be provided along an inner circumferential surface of the first body 1111. The first stator 1211 may include a first stator core 1211a fixed to the first body 1111 and a plurality of first coils 1211b disposed along the inner circumference of the first stator core 1211a.

The first rotor 1212 may be seated inside the first stator 1211 and may be coupled to the shaft 130 that is inserted into a hollow in the center of the first rotor 1212. A first magnet 1212a corresponding to the first coil 1211b may be mounted on the outer circumference of the first rotor 1212.

In the driving operation of the first driving module 121, the motion of the first driving module 121 may be controlled by the first inverter 191 of the control unit 190. Accordingly, when an electric current is applied to the first stator 1211, a magnetic field may be formed between the first coil 1211b and the first magnet 1212a of the first rotor 1212, and the first rotor 1212 may rotate due to the magnetic field.

When the first rotor 1212 rotates, the shaft 130 fixed to the inside of the first rotor 1212 may rotate together with the first rotor 1212. When the shaft 130 rotates together with the first rotor 1212, the transfer shaft 1411, which will be described below, fixedly coupled to the shaft 130 may also rotate, and a carrier 1412 may rotate along with the rotation of the transfer shaft 1411. Planetary gears 1413 fixed to the carrier 1412 may rotate around the central axis of the transfer shaft 1411 and thus may rotate individually due to the gear meshing structure. This configuration will be described in detail when the reduction gear part 140 is described.

The second driving module 122 (hereinafter also referred to as a "control motor") according to an exemplary embodiment of the present disclosure may be provided to form a variable speed ratio of a vehicle. As described above, the second driving module 122 may be housed in the second body part 112. The second driving module 122 may be provided to rotate around the center of the housing 110.

The second driving module 122 may be disposed between the outer side of the reduction gear part 140 and the inner side of the second body 1121 and may include a second stator 1221 and a second rotor 1222. The second stator 1221 may be formed in a circular shape along an inner surface of the second body 1121 and may include a second stator core 1221a fixed to the second body 1121 and a plurality of second coils 1221b disposed along the inner circumference of the second stator core 1221a.

The second rotor 1222 may be seated inside the second stator 1221 and may be rotatably coupled to the second stator 1221 to rotate around the central axis of the housing 110, and a second magnet 1222a corresponding to the second coil 1221b may be mounted on the second rotor 1222. The second magnet 1222a may be provided along an outer surface of the second rotor 1222 to correspond to the second coil 1221b.

As will be described below, among the elements of the reduction gear part 140, the second sun gear 1431 may be provided inside the second rotor 1222 and, specifically, in a rotating housing 123 mounted inside the second rotor 1222. The second sun gear 1431 may rotate along with the rotation of the second rotor 1222, and the second rotor 1222 may be used as a portion of the reduction gear part 140. In other words, the second rotor 1222 may function as a part of the second driving module 122 and also a part of the reduction gear part 140.

In the driving of the second driving module 122, the motion of the second driving module 122 may be controlled by the second inverter 192 of the control unit 190. Accordingly, when an electric current is applied to the second stator 1221, a magnetic field may be formed between the second coil 1221b and the second magnet 1222a of the second rotor 1222, and the second rotor 1222 may rotate due to the magnetic field.

The rotating housing 123, which will be described below, may rotate along with the second rotor 1222. When the second sun gear 1431 rotates, the rotation of the second rotor 1222 may be transferred to gears of the reduction gear part 140 that is in the gear meshing with the second sun gear 1431.

The rotating housing 123 which rotates along with the second rotor may be fixedly coupled to an inner surface of the second rotor. The rotating housing 123 may have a cylindrical shape and may form a space in which the reduction gear part 140 is mounted. A first hole 1232 through which the transfer shaft 1411 of the second gear module 142, which will be described below, is to pass and a second hole 1231 through which the extension shaft 1421 of a third gear module 143 is to pass may be provided on one surface and the other surface of the rotating housing 123, respectively. Further, the third gear module 143 with a cylindrical protrusion shape may extend toward the inside of the rotating housing 123 along the circumference of the first hole 1232 and may be formed integrally with the rotating housing 123.

Figure 6:
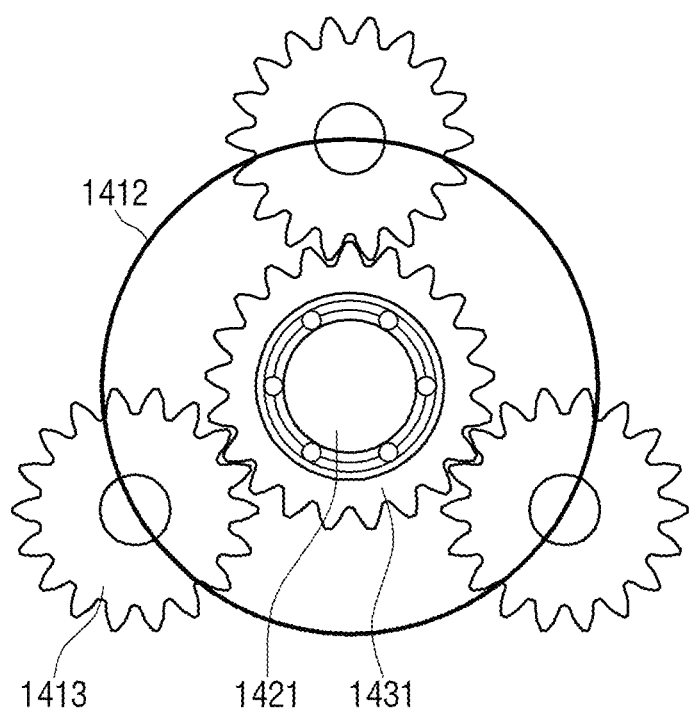
FIG. 6 is a schematic sectional view of a second driving module at a predetermined position of the center of an extension shaft in the vehicle drive device with the variable transmission according to an exemplary embodiment of the present disclosure.

FIG. 6 is a schematic sectional view of the second driving module 122 at a predetermined position of the center of the extension shaft 1421 in the vehicle drive device 100 with the variable transmission according to an embodiment of the present disclosure. FIG. 7 is a schematic sectional view of the second driving module 122 at a predetermined position of an end portion of the extension shaft 1421 in the vehicle drive device 100 with the variable transmission according to an exemplary embodiment of the present disclosure.

Figure 7:
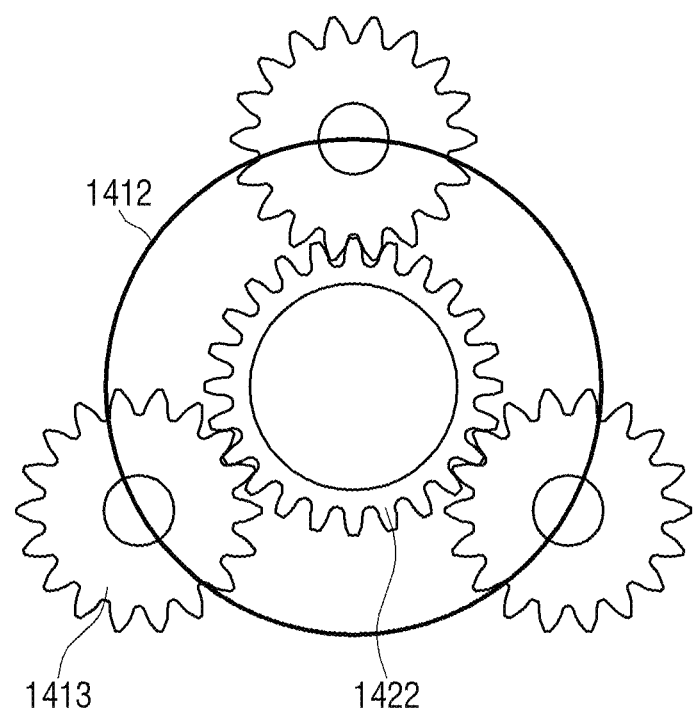
FIG. 7 is a schematic sectional view of the second driving module at a predetermined position of an end portion of the extension shaft in the vehicle drive device with the variable transmission according to an exemplary embodiment of the present disclosure.

Referring to FIGS. 6 and 7 together with FIG. 4, the reduction gear part 140 according to an exemplary embodiment of the present disclosure may be provided in the second body part 112. Specifically, the reduction gear part 140 may be provided inside the second rotor 1222, and the motion of the first driving module 121 may be directly transferred to the reduction gear part 140 via the shaft 130 and the transfer shaft 1411, and the motion of the second driving module 122 may be transferred to a second sun gear 1431.

The reduction gear part 140 may include a first gear module 141, a second gear module 142, and a third gear module 143. The first gear module 141 may include a transfer shaft 1411, a plurality of vertical shafts 1414, and a circular carrier 1412. The transfer shaft 1411 may be seated in a recess 130a of the shaft 130 to rotate together with the shaft 130. For example, a plurality of teeth may be formed on an inner surface of the recess 130a in the axial direction, and engagement teeth engaged with the teeth may be formed on an outer surface of the end portion of the transfer shaft 1411 to be inserted into the recess 130a. Since the teeth are engaged with the engagement teeth, the transfer shaft 1411 may rotate when the shaft 130 rotates. In some exemplary embodiments, the shaft 130 and the transfer shaft 1411 may be coupled via a spline coupling.

The plurality of vertical shafts 1414 may be rotatably provided by mounting the planetary gear 1413, which will be described below, and may be provided around an end portion of the transfer shaft 1411. Further, the plurality of vertical shafts 1414 may be provided between the circular carrier 1412, which will be described below, and the transfer shaft 1411 and around the end portion of the transfer shaft 1411. In an exemplary embodiment of the present disclosure, the number of vertical shafts 1414 may be three by way of an example.

The carrier 1412 may have a circular shape, and specifically, a disk shape, and the end portion of the vertical shaft 1414 may be coupled to the carrier 1412. The carrier 1412 may be provided integrally with the transfer shaft 1411 through the plurality of vertical shafts 1414. Accordingly, when the transfer shaft 1411 rotates, the carrier 1412 may rotate around the center of the transfer shaft 1411 together with the transfer shaft 1411.

A plurality of the planetary gears 1413 may rotate around the vertical shafts 1414 as it is coupled thereto, and may be provided between the carrier 1412 and the transfer shaft 1411 to rotate around the axis of the transfer shaft 1411 along with the rotation of the transfer shaft 1411. In other words, the plurality of planetary gears 1413 may rotate (e.g., spin) around the vertical shaft 1414 and revolve around the axis of the transfer shaft 1411.

The plurality of planetary gears 1413 may implement rotational speed reduction by engaging with the first sun gear 1422 of the second gear module 142 and the second sun gear 1431 of the third gear module 143.

The second gear module 142 may be in gear meshing with the first gear module 141 and may include the extension shaft 1421 and the first sun gear 1422.

The extension shaft 1421 may extend from one end of the shaft 130 in the axial direction and pass through the second hole 1231 through a hollow cylindrical protrusion of the rotating housing 123. The extension shaft 1421 may have an inverted T-shaped cross section. The first sun gear 1422 may be formed on an outer surface of one end of the extension shaft 1421 and may be in gear meshing with the planetary gear 1413. An insertion recess 142a into which the transfer shaft 1411 is to be inserted may be formed on a bottom surface of one end of the extension shaft 1421, and thereby the extension shaft 1421 may be coupled to the transfer shaft 1411 such that the rotation of the transfer shaft 1411 is not directly transferred to the extension shaft 1421. For example, a bearing may be provided between the insertion recess 142a and the transfer shaft 1411, and accordingly, the insertion recess 142a and the transfer shaft 1411 may slide and rotate relative to each other.

The third gear module 143 may be provided inside the second driving module 122 and may be provided integrally with the rotating housing 123 as described above. The third gear module 143 may be formed on the rotating housing 123 and, specifically, on an outer surface of the cylindrical protrusion and may include a second sun gear 1431 that is in gear meshing with the planetary gear 1413. The second sun gear 1431 may be spaced upward from the first sun gear 1422.

In the case of the reduction gear part 140 provided as described above, by combining the shaft 130 and the transfer shaft 1411, the rotational motion of the first driving module 121 may drive the planetary gear 1413 to revolve via the transfer shaft 1411. Also, the rotation of the second driving module 122 may be transferred to the planetary gear 1413 via the second sun gear 1431 by the rotation of the rotating housing 123. Further, the planetary gear 1413 may be coupled to the first sun gear 1422. Eventually, the rotation of the first sun gear 1422 may be transferred to the output part 150 through the extension shaft 1421.

Therefore, the reduction gear part 140 may generate a reduction ratio through the carrier 1412 that takes an input using the rotation of the first driving module 121, the second sun gear 1431 that rotates along with the rotation of the second rotor due to the rotation of the carrier 1412, and the first sun gear 1422 that implements an output by rotating along with the planetary gear 1413 that rotates in engagement with the second sun gear 1431.

The vehicle drive device 100 with the variable transmission according to an exemplary embodiment of the present disclosure is provided with two drive devices (i.e., the first driving module 121 and the second driving module 122) and one reduction device (i.e., the reduction gear part 140). Also, the reduction device may be connected to at least one of the two driving modules. Accordingly, the vehicle drive device 100 with the variable transmission may be driven in a first mode and a second mode depending on the driving of the driving device. For example, in the first mode, both of the first driving module 121 and the second driving module 122 may be driven. Accordingly, as described above, the first driving module 121 may function as a motor that provides a driving force, and the second driving module 122 may function as a motor that controls a transmission ratio.

In addition, in the second mode, one of the first driving module 121 or the second driving module 122 may be driven, and the other may be fixed. For example, the first driving module 121 may be fixed according to the settings or due to a failure. In this case, the second driving module 122 may provide the driving force, and the driving force of the second driving module 122 may be used for the reduction gear part 140 to implement the speed reduction to control the transmission ratio.

On the other hand, the second driving module 122 may be fixed according to the settings or due to a failure. In this case, the first driving module 121 may provide the driving force, and the driving force of the first driving module 121 may be used for the reduction gear part 140 to implement the speed reduction to control the transmission ratio.

As described above, the reduction gear part 140 according to an exemplary embodiment of the present disclosure may generate a reduction ratio based on the relationships between the carrier 1412, the second sun gear 1431, the planetary gear 1413, and the second sun gear 1431.

The output part 150 according to an exemplary embodiment of the present disclosure may be disposed on an upper surface of the rotating housing 123, and a coupling recess 151 may be formed on a lower surface of the output part 150 to allow the extension shaft 1421 that is exposed through the second hole 1231 to be inserted thereinto. The coupling recess 151 and an end portion of the extension shaft 1421 may be in a meshing engagement with each other to transfer a rotational force.

A plurality of first teeth may be provided on the other end of the extension shaft 1421 in the axial direction, and second teeth to be in meshing engagement with the plurality of first teeth may be formed on an inner surface of the coupling recess 151. In some exemplary embodiments, the extension shaft 1421 and the output part 150 may be coupled using a spline coupling.

Further, a support member 1124 coupled to the rotating housing 123 to support the output part 150 may be provided between the second cover 1122 and the upper surface of the rotating housing 123.

A bearing member may be provided on an outer circumferential surface of the shaft 130, the transfer shaft 1411, and the connection shaft 130 to reduce the rotational friction between the elements in contact with the shaft 130, the transfer shaft 1411, and the connection shaft 130 when they rotate.

For example, the bearing member 170 may each be provided between one end of the shaft 130 and the first exposure hole 111*a*, between the other end of the shaft 130 and the first connection hole 111*b*, between the second connection hole 112*b* and the transfer shaft 1411, between the transfer shaft 1411 and the first hole 1232, between an end portion of the transfer shaft 1411 and the insertion recess 142*a*, and between an end portion of the extension shaft 130 and the support member 1124.

Figure 8A:
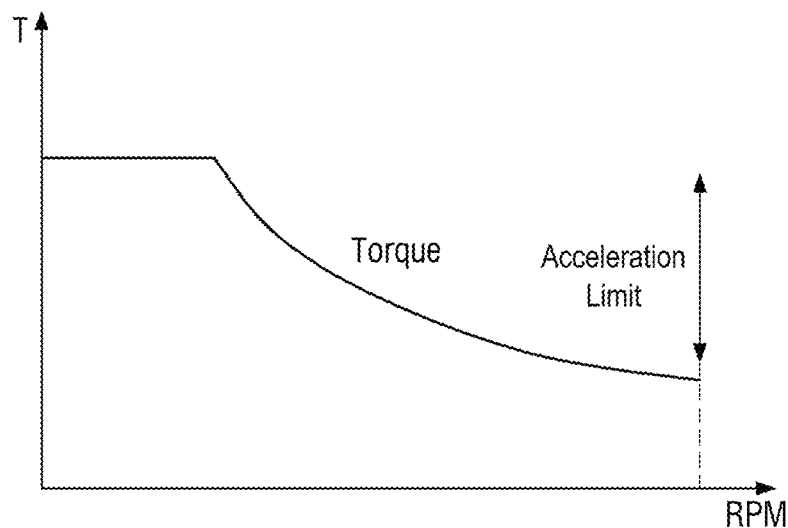
FIGS. 8A and 8B are graphs that compare output torques in a conventional vehicle drive device and the vehicle drive device with the variable transmission according to an exemplary embodiment of the present disclosure.
Figure 8B:
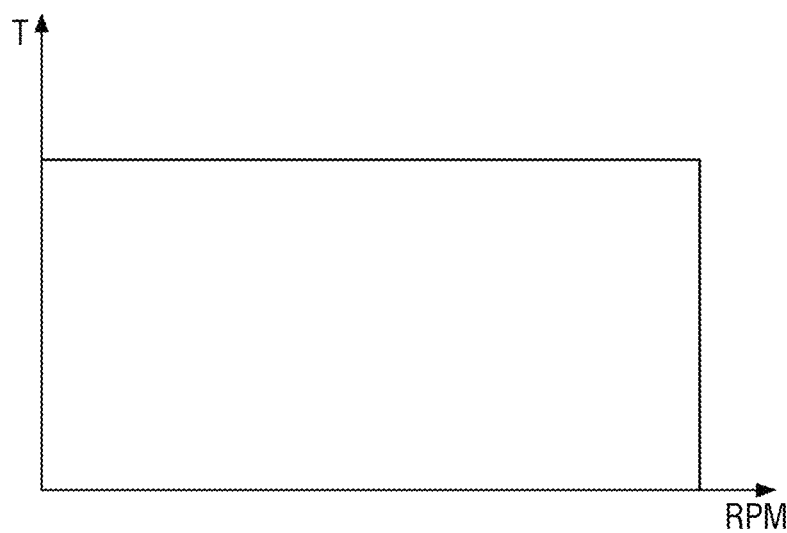

FIGS. 8A and 8B are graphs that compare output torques in a conventional vehicle drive device and the vehicle drive device with the variable transmission according to an exemplary embodiment of the present disclosure.

Referring to FIG. 8A, for a vehicle drive device with a conventional single reducer, it can be seen that the power (i.e., the output torque) of the vehicle drive device decreases as it accelerates toward the high speed. It can also be seen that acceleration is limited due to a decrease in the power of the vehicle drive device.

However, as shown in FIG. 8B, when the reduction gear part 140 is provided as a variable reducer according to the present disclosure, it can be seen that the maximum output torque is kept constant due to the structure of the reducer as well as by the driving of the first driving module 121 and the second driving module 122 when it accelerates toward the higher speeds.

Figure 9:
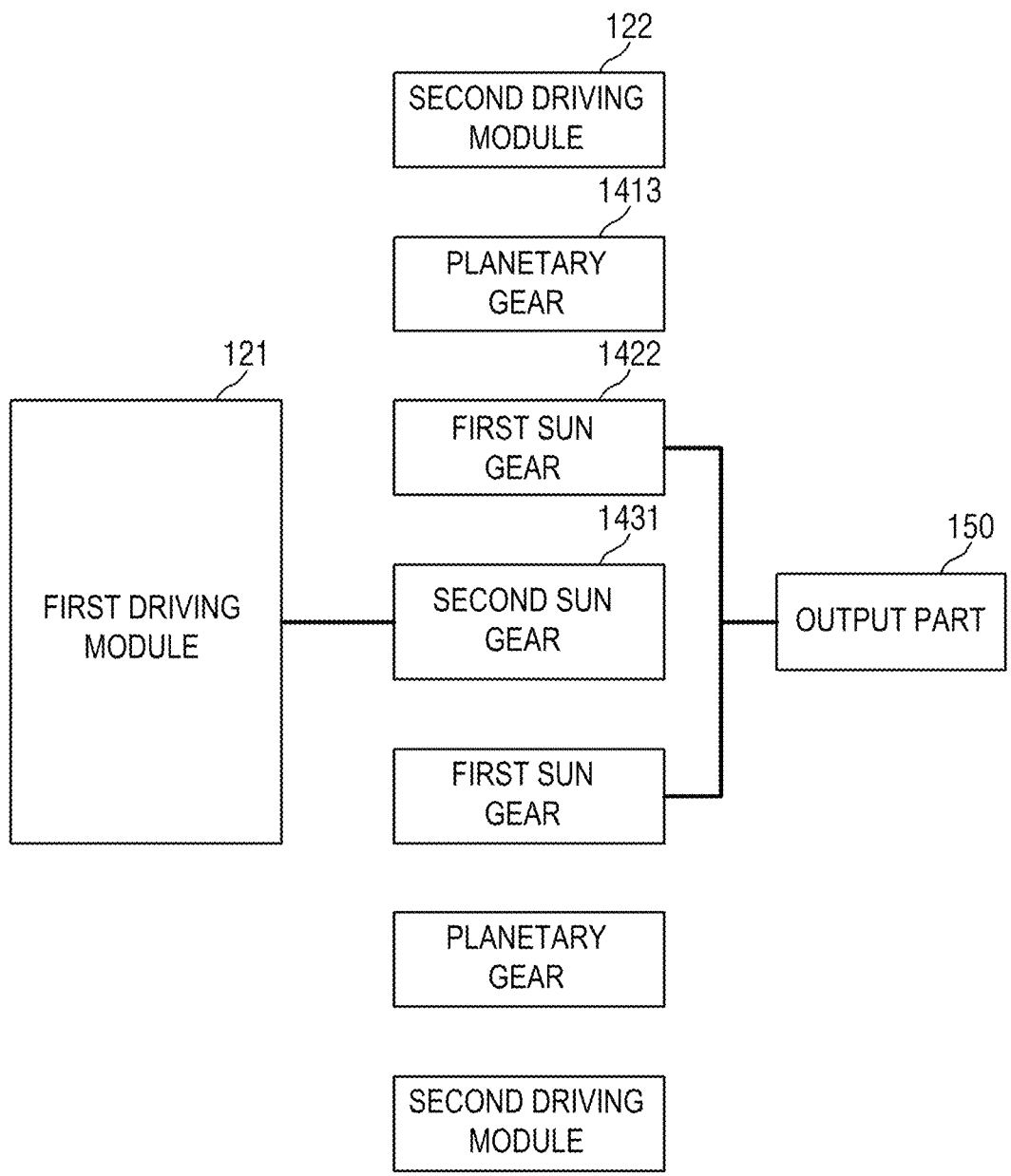
FIG. 9 is a view schematically showing an example of connection between a first driving module, the second driving module, and an output part in the vehicle drive device with the variable transmission according to an exemplary embodiment of the present disclosure.

FIG. 9 is a view schematically showing an example of connection between the first driving module 121, the second driving module 122, and the output part 150 in the vehicle drive device 100 with the variable transmission according to an exemplary embodiment of the present disclosure. Referring to FIG. 9, the first driving module 121 may be connected to the second sun gear 1431, and the second driving module 122 may be connected to the planetary gear 1413. Also, the first sun gear 1422 may be connected to the output part 150.

Due to the coupling relationships between the first driving module 121, the second driving module 122, and the reduction gear part 140, the rotational speed that is output from the first driving module 121 may be transferred to the second sun gear 1431 connected to the first driving module 121. Also, the rotational speed of the planetary gear 1413 may be controlled by controlling the second driving module 122. Accordingly, the first sun gear 1422 may be engaged with the planetary gear 1413 and the second sun gear 1431, and the first sun gear 1422 may rotate in engagement with the planetary gear 1413 and the second sun gear 1431. Accordingly, the output part 150 connected to the first sun gear 1422 may receive and output the rotation of the first sun gear 1422. Therefore, the first driving module may have a fixed speed ratio, but the rotational speed of the output part 150 and the speed ratio of the reduction gear part 140 may be adjusted by controlling the speed of the second driving module 122.

Figure 10:
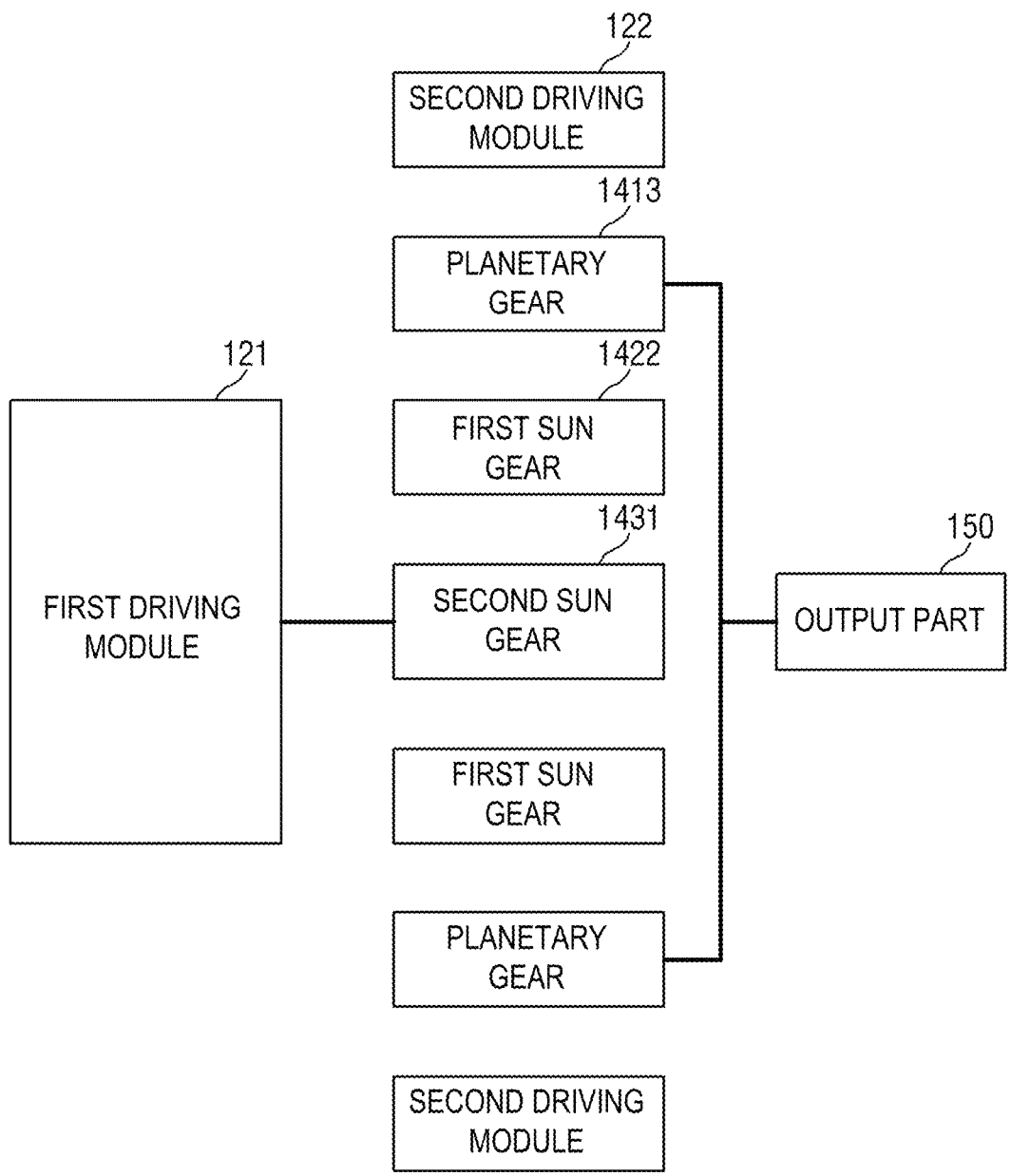
FIG. 10 is a view schematically showing another example of connection between the first driving module, the second driving module, and the output part in the vehicle drive device with the variable transmission according to an exemplary embodiment of the present disclosure.

FIG. 10 is a view schematically showing another example of connection between the first driving module 121, the second driving module 122, and the output part 150 in the vehicle drive device 100 with the variable transmission according to an exemplary embodiment of the present disclosure. Referring to FIG. 10, the first driving module 121 may be connected to the second sun gear 1431, the second driving module 122 may be connected to the first sun gear 1422, and the output part 150 may be connected to the planetary gear 1413.

Due to the coupling relationships between the first driving module 121, the second driving module 122, and the reduction gear part 140, the rotational speed that is output from the first driving module 121 may be transferred to the second sun gear 1431 connected to the first driving module 121. Also, the rotational speed of the first sun gear 1422 may be adjusted by controlling the second driving module 122. Accordingly, the planetary gear 1413 may rotate in engagement with the first sun gear 1422 and the second sun gear 1431. The rotation of the planetary gear 1413 may be transferred to the output part 150 connected to the planetary gear 1413. Therefore, the first driving module 121 may have a fixed speed ratio, but the rotational speed of the output part 150 and the speed ratio of the reduction gear part 140 may be adjusted by controlling the speed of the second driving module 122.

Figure 11:
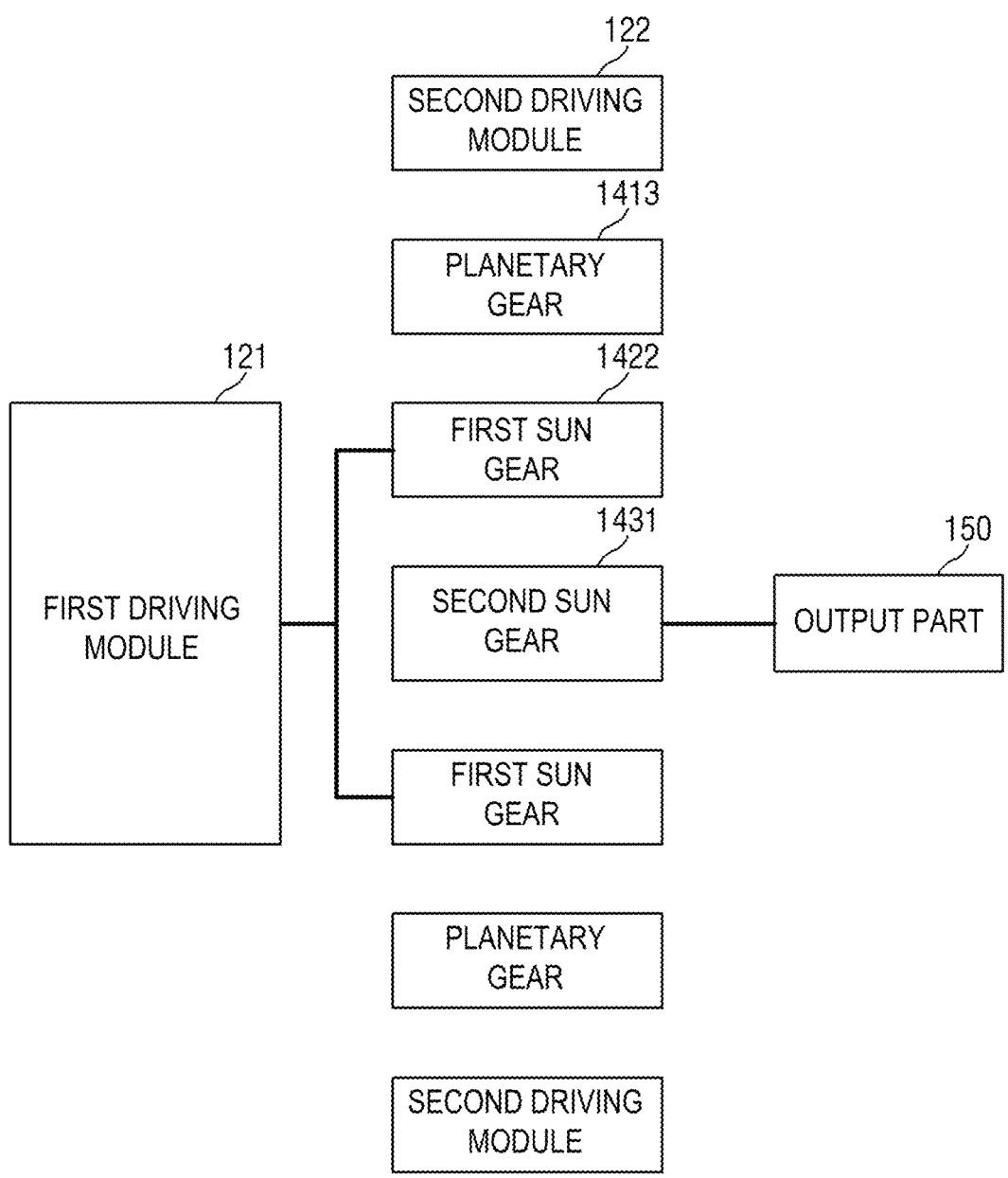
FIG. 11 is a view schematically showing another example of connection between the first driving module, the second driving module, and the output part in the vehicle drive device with the variable transmission according to an exemplary embodiment of the present disclosure.

FIG. 11 is a view schematically showing another example of connection between the first driving module 121, the second driving module 122, and the output part 150 in the vehicle drive device 100 with the variable transmission according to an exemplary embodiment of the present disclosure. Referring to FIG. 11, the first driving module 121 may be connected to the first sun gear 1422, the second driving module 122 may be connected to the planetary gear 1413, and the output part 150 may be connected to the second sun gear 1431.

Due to the coupling relationships between the first driving module 121, the second driving module 122, and the reduction gear part 140, the rotational speed that is output from the first driving module 121 may be transferred to the first sun gear 1422 connected to the first driving module 121. Also, the rotational speed of the planetary gear 1413 may be adjusted by controlling the second driving module 122. Accordingly, the second sun gear 1431 may rotate in engagement with the first sun gear 1422 and the planetary gear 1413, and the rotation of the second sun gear 1431 may be transferred to the output part 150. Therefore, the first driving module 121 may have a fixed speed ratio, but the rotational speed of the output part 150 and the reduction ratio of the reduction gear part 140 may be adjusted by controlling the speed of the second driving module 122.

Further, for the vehicle drive device 100 having the structures of FIGS. 9 to 11, it can be seen that the first driving module 121 and/or the second driving module 122 may generate electrical power being used as a generator or via reverse driving of a motor. In this case, when the wheel rotates, the output part 150 may be rotated by the rotation of the wheel. When the output part 150 rotates, the rotational force of the output part 150 may be transferred to the first sun gear 1422 connected to the output part 150. Also, the first sun gear 1422 may be rotated by the rotational force of the output part 150, and the first driving module 121 and the second driving module 122 may be driven as a generator to generate electrical power.

As described above with reference to FIGS. 9, 10, and 11, the first driving module 121, the second driving module 122, and the output part 150 may be selectively connected to the first sun gear 1422, the second sun gear 1431, and the planetary gear 1413, respectively.

Also, the vehicle drive device 100 according to an exemplary embodiment of the present disclosure may be driven in the first mode in which both of the first driving module 121 and the second driving module 122 are driven and in the second mode in which only one of the first driving module 121 or the second driving module 122 is driven. Also, in the case of the driving in the second mode, that is, when only one of the first driving module 121 and the second driving module 122 is fixed and the other is driven, the output part 150 may rotate at a fixed reduction ratio.

For example, when the first driving module 121 is fixed (e.g., held or locked) and only the second driving module 122 is driven, the second driving module 122 may provide the driving force through the planetary gear 1413, and the second sun gear 1431 may be fixed. Thus, the rotational speed may be output at a particular reduction ratio. In an exemplary embodiment of the present disclosure, an example in which the first driving module 121 is fixed and only the second driving module 122 is driven has been described, but the present disclosure is not limited thereto. For example, the second driving module 122 may be fixed (e.g., held or locked) and only the first driving module 121 may be driven. In this case, the rotational speed may be output at a fixed ratio through the driving force of the second driving module 122.

The second mode may also be used when one of the first driving module 121 or the second driving module 122 is inoperable due to a failure or malfunction or used when the mode selected by a user or a driver.

The driving operation of the vehicle drive device 100 according to an exemplary embodiment of the present disclosure will be described.

In general, a high torque is required for initial vehicle driving, and a high speed is required for fast driving. Accordingly, first, the control unit 190 may drive the first driving module 121 and the second driving module 122 through the control of the first inverter 191 and the second inverter 192.

The reduction gear part 140 may be driven both by driving the first driving module 121 and by driving the second driving module 122. Accordingly, the driving operation may be selected for the initial vehicle driving or for fast driving.

In particular, when the driving part 120 is operated for initial vehicle driving, the object may be generating the maximum torque by maximally loading the second driving module 122. On the other hand, when the driving part 120 is operated for fast driving, the object may be generating the maximum RPM by synchronizing the speeds of the first driving module 121 and the second driving module 122.

As described above, the vehicle drive device 100 according to an exemplary embodiment of the present disclosure may include one reduction gear part 140 and dual driving modules using a coil and a magnet. The reduction gear part 140 may form and output a reduction ratio and have variable speed or a fixed torque through engagement of two sun gears with three planetary gears 1413. Thus, it is possible to stably maintain a constant high-speed output torque during both initial vehicle driving and fast driving. Herein, the initial vehicle driving is not limited to actual initial driving, but it may also refer to when a high torque is required such as, for example, launching, acceleration, climbing a hill, under a heavy load, in adverse road conditions, and the like. The fast driving, similarly, may also refer to when a high efficiency is preferred over a high torque such as, for example, cruising, economic driving mode, downhill descent, and the like.

The first exemplary embodiment of the present disclosure in which the vehicle drive device with the variable transmission is implemented in a planetary gear type has been described above. The second exemplary embodiment of the present disclosure in which the vehicle drive device is implemented using a magnetic reducer will be described below.

Figure 12:
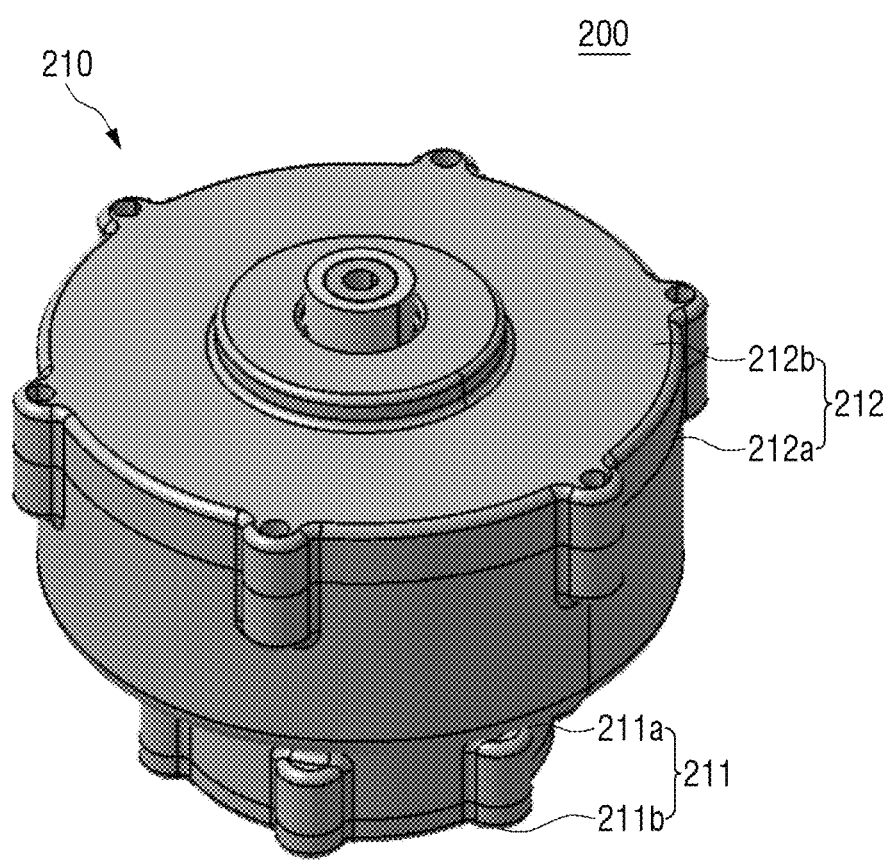
FIG. 12 is a schematic external perspective view of a vehicle drive device with a variable transmission according to a second exemplary embodiment of the present disclosure.
Figure 13:
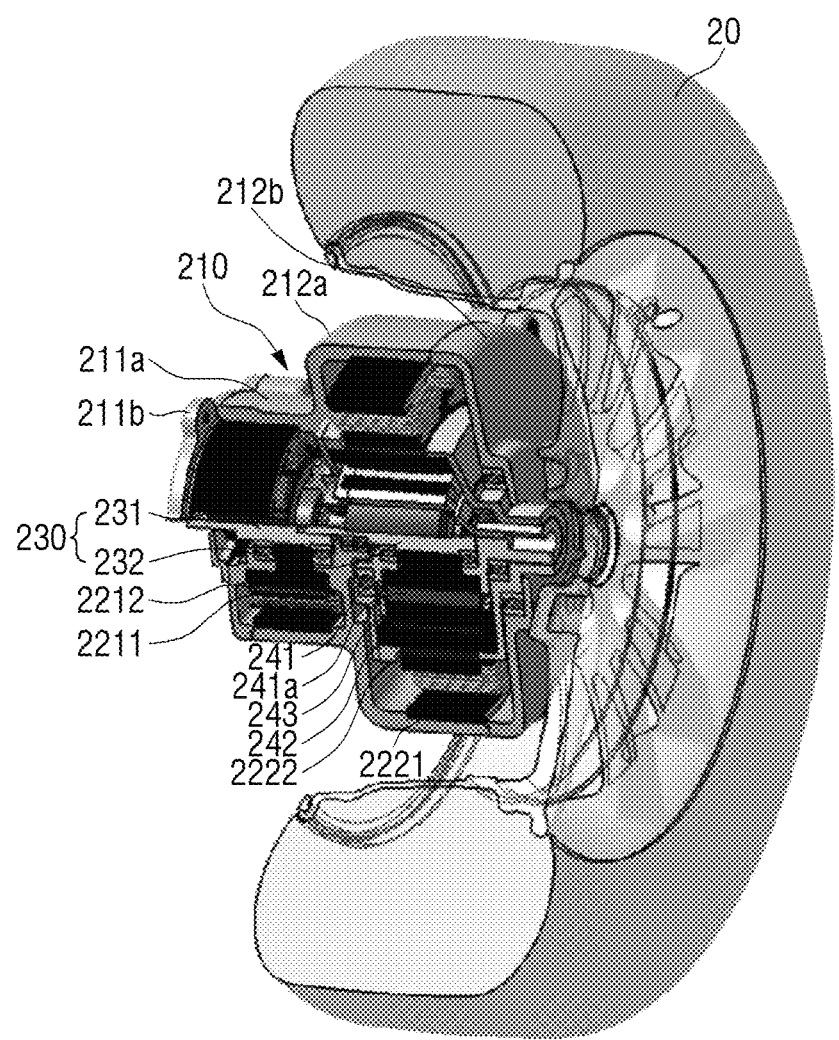
FIG. 13 is a schematic partial sectional internal perspective view of the vehicle drive device with the variable transmission installed in a wheel according to the second exemplary embodiment of the present disclosure.
Figure 14:
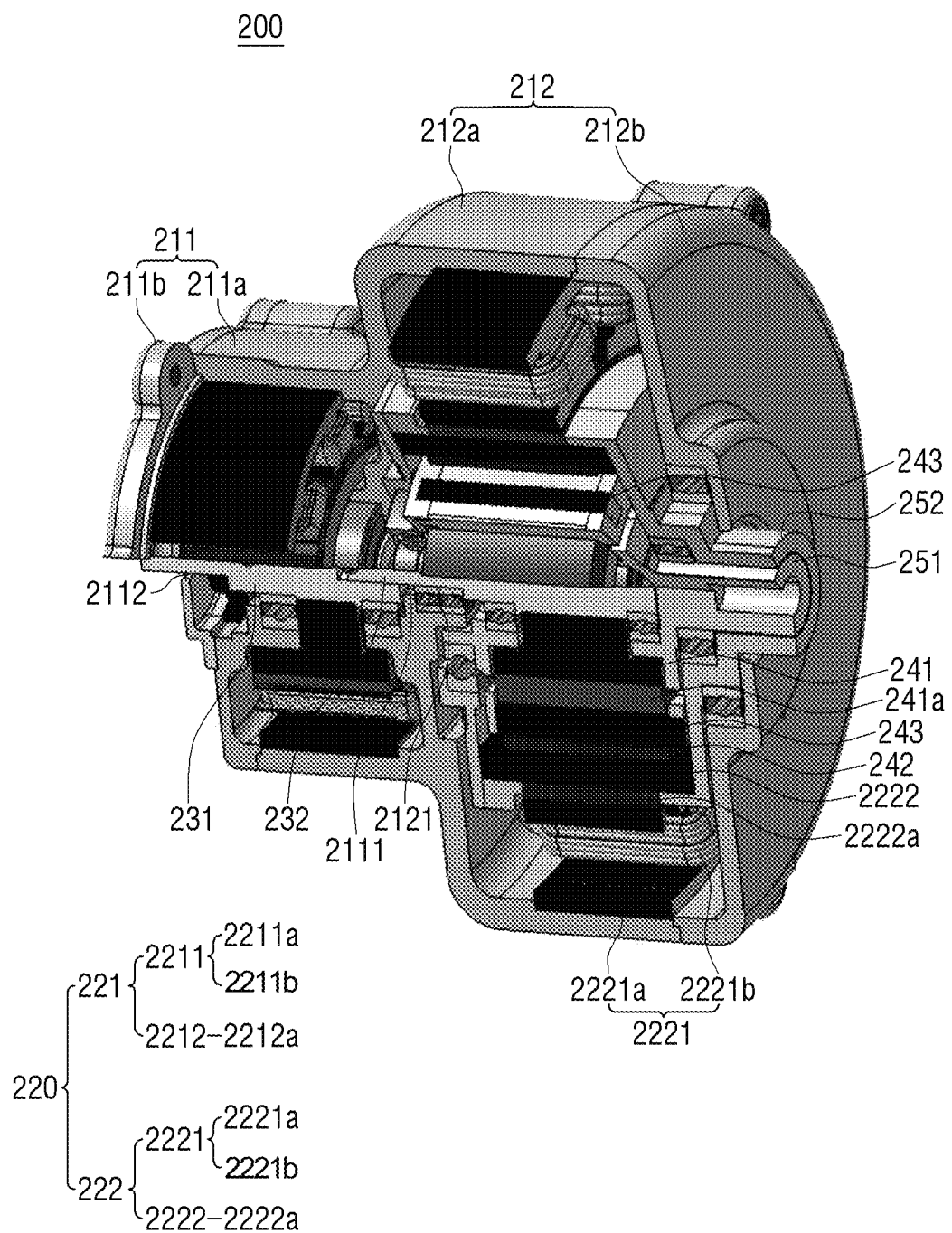
FIG. 14 is a sectional perspective view showing internal coupling in the vehicle drive device with the variable transmission according to the second exemplary embodiment of the present disclosure.
Figure 15:
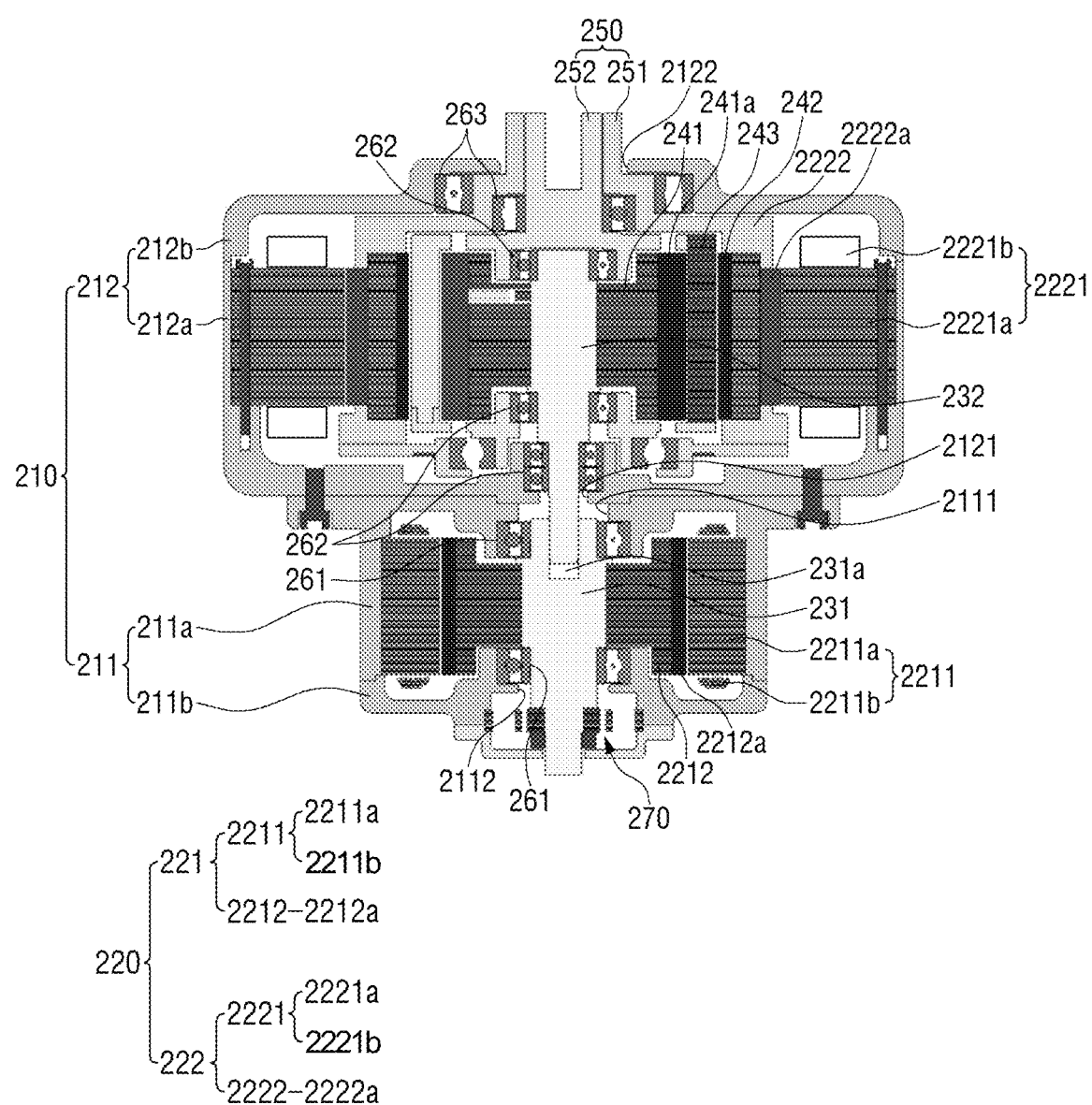
FIG. 15 is a cross-sectional view showing internal coupling of the vehicle drive device with the variable transmission according to the second exemplary embodiment of the present disclosure.

FIG. 12 is a schematic external perspective view of a vehicle drive device 200 with a variable transmission according to the second exemplary embodiment of the present disclosure. FIG. 13 is a schematic partial sectional internal perspective view of the vehicle drive device with the variable transmission installed in a wheel according to the second exemplary embodiment of the present disclosure. FIG. 14 is a sectional perspective view showing internal coupling in the vehicle drive device with the variable transmission according to the second exemplary embodiment of the present disclosure. FIG. 15 is a cross-sectional view showing internal coupling of the vehicle drive device with the variable transmission according to the second exemplary embodiment of the present disclosure.

Referring to FIGS. 12 to 15, the vehicle drive device 200 with the variable transmission according to the second exemplary embodiment of the present disclosure may include a housing 210, a driving part 220, a shaft part 230, a reduction part 240, and an output part 250.

The housing 210 may be accommodated inside the wheel 20 and provided to accommodate the driving part 220, the reduction part 240, and the output part 250 therein. The housing 210 may include a first body part 211 and a second body part 212.

The first body part 211 may include a first body 211a and a first cover 211b. One surface of the first body 211a may be open in a first direction, and a space capable of accommodating a first shaft 231 and a first driving module 221, which will be described below, may be formed inside the first body 211a. The first cover 211b may be coupled to the open surface of the first body 211a to cover the space of the first body 211a. In addition, the other surface of the first body 211a may be coupled to one surface of a second body 212a, which will be described below. A first hole 2112 may be formed on the other surface of the first body 211a and, specifically, at the center of the other surface of the first body 211a to connect to a second hole 2122 formed in a space of the second body 212a and, specifically, on one surface of the second body 212a. The other surface of the first body 211a and the other surface of the second body 212a may be provided in a detachable form or in an integrated form.

A first exposure hole 2111 for exposing an end portion of the first shaft 231, which will be described below, may be formed in the first cover 211b. Also, a resolver module 270 for detecting a rotation angle of the first shaft 231 exposed outward from the first cover 211b may be further provided on an outer surface of the first cover 211b.

The resolver module 270 may include a permanent magnet provided along an outer surface of the first shaft 231 and a Hall sensor spaced apart from the permanent magnet and provided along the circumference of the first shaft 231. The Hall sensor may detect the permanent magnet and may detect the number of rotations of the first shaft 231. However, the resolver module 270 is not limited thereto, and any changes or modifications are also possible as long as it can detect a rotation angle via the rotation of the first shaft 231.

The second body part 212 may include a second body 212a and a second cover 212b. The second body 212a may be provided on the other surface of the first body 211a and may be open in a second direction opposite to the first direction. Therefore, while the one surface of the first body 211a and the other surface of the second body 212a are combined with each other, the other surface of the first body 211a and the one surface of the second body 212a may be open. A space may be formed inside the second body 212a to accommodate a second driving module 222, which will be described below, the reduction part 240, and a second shaft 232. The second cover 212b may be coupled to the open surface of the second body 212a to cover the space of the second body 212a. The second hole 2122 may be formed on one surface of the second body 212a and, specifically, at the center of the surface of the second body 212a to connect to the first hole 2112.

The first shaft 231 and the first driving module 221 may be housed in the first body 211a, while the reduction part 240, which will be described below, as well as the second driving module 222 and the second shaft 232 may be further provided in the second body 212a. Accordingly, the second body 212a may have a larger diameter than the first body 211a. A second exposure hole 2121, through which the output part 250 is to be exposed, may be formed in the second cover 212b, and specifically, at the center of the second cover 212b.

The shaft part 230 according to the second exemplary embodiment of the present disclosure may be elongated from the first cover 211b to the second cover 212b in the lengthwise direction (e.g., axial direction or longitudinal direction) and may include the first shaft 231 and the second shaft 232.

The first shaft 231 may be disposed at the center of the first body 211a to form an axis and, specifically, the rotation axis of the first driving module 221, which will be described below, and to be rotated by the rotation of the first driving module 221. Specifically, the first shaft 231 may be inserted into a hollow of an input rotor 2212 of the first driving module 221, which will be described below, to rotate along with the rotation of the input rotor 2212. Also, one end of the first shaft 231 may be provided in the first cover 211b side, and the other end of the second shaft 232 may be provided in the first exposure hole 2111 side. Therefore, the first shaft 231 may be partitioned into a first region where the input rotor 2212 is fixed, as well as one end and the other end portions outside the first region.

A recess 231a may be formed in one surface of the other end of the first shaft 231, and an end portion of the second shaft 232 may be inserted into and coupled to the recess 231a. One end of the first shaft 231 may protrude outward from the first cover 211b through the first exposure hole 2111 of the first cover 211b. The second shaft 232 may be disposed at the center of the second body 212a to form an axis and, specifically, the rotation axis of the second driving module 222, which will be described below in detail.

The second shaft 232 may be inserted into a third rotor 241 of the reduction part 240, which will be described below, to rotate together with the third rotor 241. One end of the second shaft 232 may protrude toward the first hole 2112 of the first body 211a and thus may be inserted into and coupled to the recess 231a of the first shaft 231. The other end of the second shaft 232 may be disposed inside a second rotor (hereinafter referred to as a pole piece module 243), which will be described below. Therefore, the second shaft 232 may be partitioned into a second region where the third rotor 241 is fixed, as well as one end and the other end portions outside the second region.

In the second exemplary embodiment of the present disclosure, an example in which the first shaft 231 and the second shaft 232 are separated from each other has been described, but the present disclosure is not limited thereto. For example, the first shaft 231 and the second shaft 232 may be integrally formed and may be coupled to the first driving module 221 and the second driving module 222, which will be described below, at the centers of the first body 211a and the second body 212a to rotate.

A bearing module 260 may be included on outer circumferential surfaces of the first shaft 231 and the second shaft 232 and on a circumferential surface of the output part 250, which will be described below, in order to minimize friction due to rotation. The bearing module 260 according to the second exemplary embodiment of the present disclosure may include a first bearing 261, a second bearing 262, and a third bearing 263.

The first bearing 261 may be provided around an end portion of the first shaft 231 with respect to the first region of the first shaft 231. Specifically, the first bearing 261 may be provided to reduce friction between the rotating first shaft 231 and a non-rotating element adjacent to the first shaft 231. For example, the first bearing 261 may be provided between an outer surface of the other end of the first shaft 231 and the first hole 2112 and between an outer surface of the one end of the first shaft 231 and the first exposure hole 2111.

The second bearing 262 may be provided around both end portions of the second shaft 232 with respect to the second region of the second shaft 232. Specifically, the second bearing 262 may be provided to reduce friction between the rotating second shaft 232 and an element adjacent to the second shaft 232. For example, the second bearing 262 may be provided between an outer surface of the one end of the second shaft 232 and the second hole 2122 and between an outer surface of one end of the second shaft 232 and an outer surface of the other end and both end portions of the third rotor 241.

The third bearing 263 may be provided in an element that extends from the other end of the second shaft 232 and forms an output shaft. For example, the third bearing 263 may be provided between an inner side of a first protrusion 251 protruding from a first rotor 2222 and an outer side of a second protrusion 252 of the output part 250, which will be described below, and between an outer side of the first protrusion 251 of the output part 250 and a second exposure hole 2121 of the second body 212a.

The driving part 220 according to the second exemplary embodiment of the present disclosure may be provided in each of the first body part 211 and the second body part 212. Specifically, the driving part 220 according to the second exemplary embodiment of the present disclosure may include a first driving module 221 and a second driving module 222.

The first driving module 221 may be accommodated inside the first body 211a to rotate the first shaft 231. Also, the motion of the first driving module 221 may be operated in a first driving mode that is used for applying a driving force to a vehicle. The second driving module 222 may be accommodated inside the second body 212a and may be operated in a second driving mode that is used for forming a variable speed ratio or a variable output ratio based on an applied electric current.

The first driving module 221 and the second driving module 222 may be controlled by being connected to a first inverter and a second inverter of the control unit, respectively. The detailed configurations of the first driving module 221 and the second driving module 222 will be described below.

The reduction part 240 according to the second exemplary embodiment of the present disclosure may be provided in the second driving module 222, and the reduction part 240 may receive at least one or both of the motion of the first driving module 221 and the driving of the second driving module 222 using the second shaft 232 as a rotation axis and may adjust the reduction ratio of the motion in a non-contact manner. The configuration of the reduction part 240 will be described below in detail with reference to FIG. 17.

The output part 250 according to the second exemplary embodiment of the present disclosure may be provided on one side of the housing 210 and, specifically, on the other surface of the second body part 212 to receive and output rotational force reduced by the reduction part 240. The output part 250 may be provided to protrude from one side of the second body part 212 and receive and output the driving of the first driving module 221.

Figure 16:
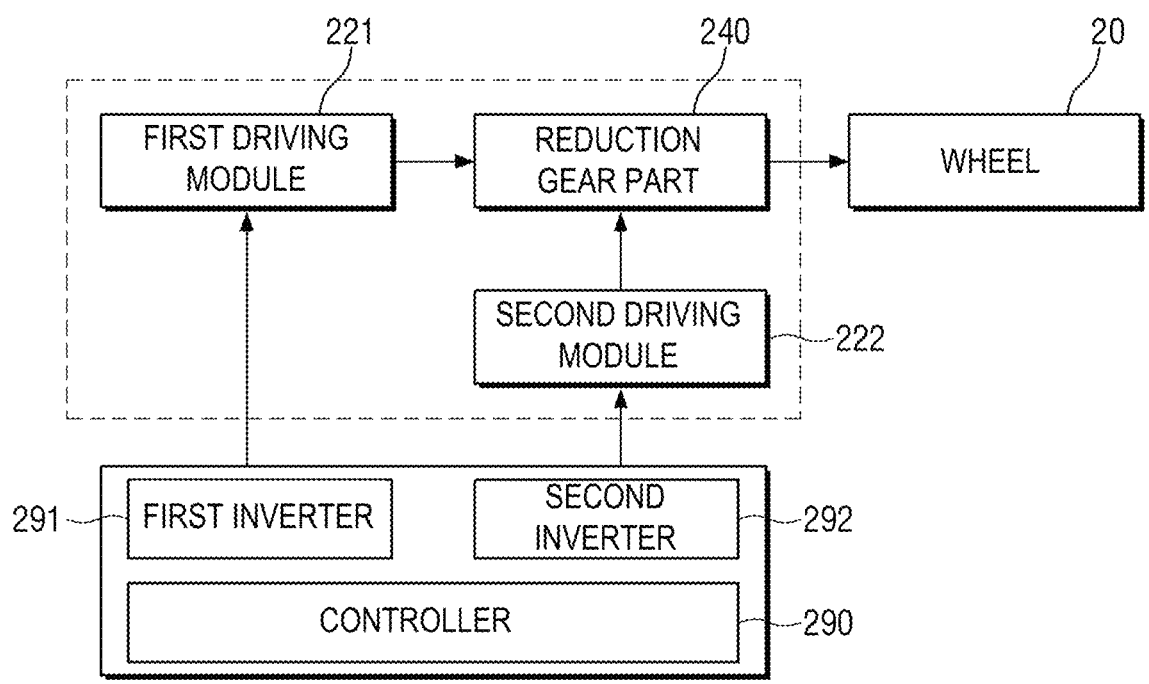
FIG. 16 is a block diagram illustrating wheel driving in the vehicle drive device with the variable transmission according to the second exemplary embodiment of the present disclosure.

FIG. 16 is a block diagram illustrating wheel driving in the vehicle drive device 200 with the variable transmission according to the second exemplary embodiment of the present disclosure. Referring to FIG. 16, for the drive device 200 provided as described above, the first driving module 221 may be driven through the driving control of the first driving module 121 in the first inverter 291 of the control unit 290, and the driving of the first driving module 221 may cause a change in speed through the reduction part 240.

Further, the second driving module 222 may be driven through the driving control of the second driving module 222 in the second inverter 292 of the control unit 290, and the driving of the second driving module 222 may cause a change in speed through the reduction part 240.

The driving of at least one of the first driving module 221 and the second driving module 222 may be applied to the reduction part 240, and the motion changed in speed by the reduction part 240 may be output via the output part 250 to drive a wheel 20 according to a function, for example, that is suitable for initial driving or fast driving.

Referring to FIG. 15, the first driving module 221 (hereinafter also referred to as an "input motor") according to the second exemplary embodiment of the present disclosure may provide a driving force for a vehicle and may be housed in the first body part 211 as described above. The first driving module 221 may be fixedly coupled to the first shaft 231 using the first shaft 231 as a rotation axis and may be coupled to the reduction part 240 by a structure in which the first shaft 231 is coupled to the second shaft 232.

The first driving module 221 may include a first stator 2211 and an input rotor 2212. The first stator 2211 may be provided along an inner circumferential surface of the first body 211a. The first stator 2211 may include a first stator core 2211a fixed to the first body 211a and a plurality of first coils 2211b disposed along the inner circumference of the first stator core 2211a.

The input rotor 2212 may be seated inside the first stator 2211 and may be coupled to the first shaft 231 by inserting the first shaft 231 into a hollow in the center of the input rotor 2212 and may rotate around the first shaft 231. A first magnet 2212a corresponding to the first coil 2211b may be mounted on the outer circumference of the input rotor 2212.

In the driving operation of the first driving module 221, the driving of the first driving module 221 may be controlled by the first inverter 291 of the control unit 290. Accordingly, when an electric current is applied to the first stator 2211, a magnetic field may be formed between the first coil 2211b and the first magnet 2212a of the input rotor 2212, and the input rotor 2212 may rotate due to the magnetic field. When the input rotor 2212 rotates, the first shaft 231 fixed to the inside of the input rotor 2212 may rotate together with the input rotor 2212.

Since the first shaft 231 rotates together with the input rotor 2212, the second shaft 232 that is fixedly coupled to the first shaft 231 may also rotate, and the rotation of the second shaft 232 may be directly transferred to the reduction part 240 coupled to an outer surface of the second shaft 232.

The second driving module 222 (hereinafter also referred to as a "control motor") according to the second exemplary embodiment of the present disclosure may be provided to form a variable speed ratio of a vehicle and may be housed in the second body part 212 as described above. The second driving module 222 may be provided to rotate around the second shaft 232.

The second driving module 222 may be disposed between the outer side of the reduction part 240 and the inner side of the second body 212a and may include a second stator 2221 and a first rotor 2222. The second stator 2221 may be formed in a circular shape along an inner surface of the second body 212a and may include a second stator core 2221a fixed to the second body 212a and a plurality of second coils 2221b disposed along the inner circumference of the second stator core 2221a. The first rotor 2222 may be seated inside the second stator 2221 and may be rotatably coupled to the second stator 2221 to rotate around the second shaft 232, and a second magnet 2222a corresponding to the second coil 2221b may be mounted on the first rotor 2222. The second magnet 2222a may be provided along an outer surface of the first rotor 2222 to correspond to the second coil 2221b.

As described below, among the elements of the reduction part 240, the fourth magnet 242 may be provided inside the first rotor 2222, and thus the first rotor 2222 may also be provided as an element of the reduction part 240. In other words, the first rotor 2222 may function as a part of the second driving module 222 and also a part of the reduction part 240.

In the driving of the second driving module 222, the driving of the second driving module 222 may be controlled by the second inverter 292 of the control unit 290. Accordingly, when an electric current is applied to the second stator 2221, a magnetic field may be formed between the second coil 2221b and the second magnet 2222a of the first rotor 2222, and the first rotor 2222 may rotate due to the magnetic field.

The fourth magnet 242 of the reduction part 240, which will be described below, may also rotate along with the rotation of the first rotor 2222, and magnetic flux may be transferred to the third rotor 241 by a pole piece of the reduction part 240.

Figure 17:
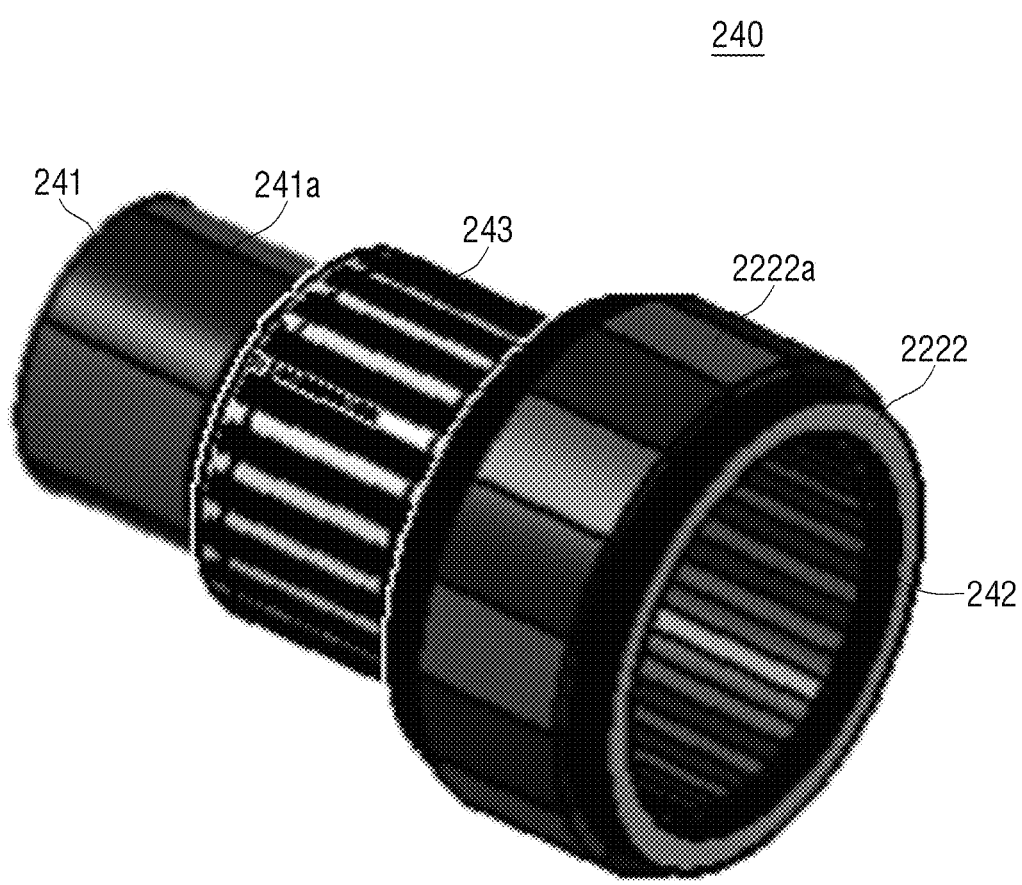
FIG. 17 is a perspective view schematically showing coupling of a reduction part in the vehicle drive device with the variable transmission according to the second exemplary embodiment of the present disclosure.

FIG. 17 is a perspective view schematically showing coupling of the reduction part 240 in the vehicle drive device 200 with the variable transmission according to the second exemplary embodiment of the present disclosure.

Referring to FIG. 17, the reduction part 240 according to the second exemplary embodiment of the present disclosure is provided in the second body part 212. Specifically, the reduction part 240 may be provided between an outer surface of the second shaft 232 and an inner side of the first rotor 2222, the motion of the first driving module 221 may be directly transferred to the shaft part 230, and the driving of the second driving module 222 may be transferred through a magnetic field.

The reduction part 240 may include the third rotor 241, the first rotor 2222, and a pole piece member. The third rotor 241 may include a hollow formed therein and may be accommodated inside the pole piece member. The second shaft 232 may be inserted into and coupled to the hollow. Since the third rotor 241 is fixedly coupled to an outer surface of the second shaft 232, the third rotor 241 may rotate along with the rotation of the second shaft 232. The third rotor 241 may rotate along with the rotation of the second shaft 232, and the third magnet 241a may be mounted on an outer surface of the third rotor 241. Magnetic flux may be transferred between the third magnet 241a and the fourth magnet 242, which will be described below.

The first rotor 2222 may be provided as an element of the second driving module 222 and an element of the reduction part 240. The fourth magnet 242 may be provided along an inner surface of the first rotor 2222.

The pole piece member may be a magnetic substance provided between the third rotor 241 and an inner side of the first rotor 2222 to transfer magnetic flux and may include a plurality of pole pieces that rotate based on the magnetic flux transferred between the third rotor 241 and the first rotor 2222. The pole piece member may have a harmonic modulator of a magnetic body rotating at a rate that changes depending on magnetic flux transferred between the first rotor 2222 and the third rotor 241.

The reduction part 240 may generate a reduction ratio by forming a high frequency through correlations between the first rotor 2222, the pole piece module 243, and the third rotor 241 and may reduce and output the motion of the first driving module 221 and the second driving module 222 via the output part 250.

The reduction part 240 of the present disclosure may perform four, i.e., first to fourth reduction modes based on the rotational motion and the rotational direction of the first rotor 2222, the pole piece module 243, and the third rotor 241. Specifically, when the reduction part 240 operates in the first reduction mode, the third rotor 241 may be fixed, and the second rotor and the pole piece may rotate in the same direction.

Further, when the reduction part 240 operates in the second reduction mode, the pole piece module 243 may be fixed, and the first rotor 2222 and the third rotor 241 may rotate in different directions.

Also, when the reduction part 240 operates in the third reduction mode, the second rotor may be fixed and the third rotor 241 and the pole piece may rotate in the same direction.

When the reduction part 240 operates in the fourth reduction mode, the first rotor 2222 may rotate in one direction and the third rotor 241 and the pole piece may rotate in the opposite direction.

As described above, the reduction part 240 according to the second exemplary embodiment of the present disclosure may perform variable reduction via the pole piece module 243, the third rotor 241, and the first rotor 2222, and specifically, the first rotor 2222 having the fourth magnet 242.

The output part 250 according to the second exemplary embodiment of the present disclosure may include a first protrusion 251 and a second protrusion 252. The first protrusion 251 may protrude from one side of the first rotor 2222 and protrude outward from the second cover 212b. The second protrusion 252 may protrude from one side of the pole piece member and may protrude outward from the second cover 212b by being inserted into the first protrusion 251.

Figure 18A:
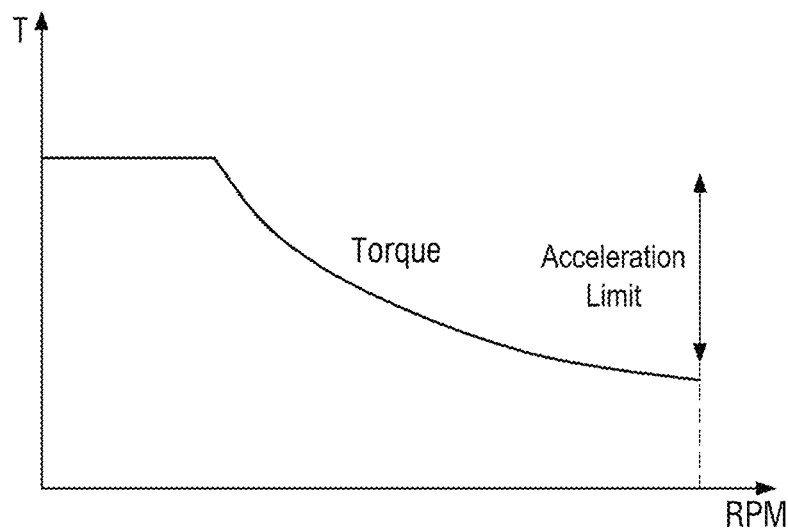
FIGS. 18A and 18B are graphs that compare output torques in a conventional vehicle drive device and the vehicle drive device with the variable transmission according to the second exemplary embodiment of the present disclosure.
Figure 18B:
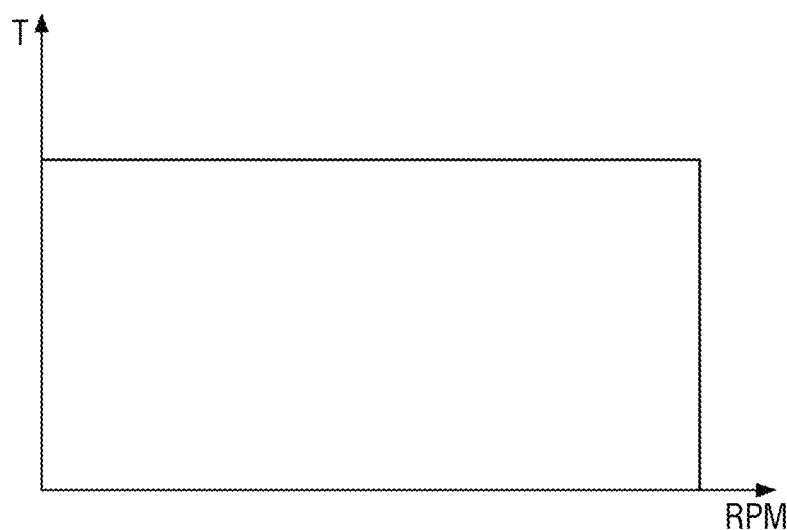

FIGS. 18A and 18B are graphs that compare output torques in a conventional vehicle drive device and the vehicle drive device with the variable transmission according to the second exemplary embodiment of the present disclosure.

Referring to FIG. 18A, for a vehicle drive device 200 with a conventional single reducer, it can be seen that the power (i.e., output torque) of the drive device 200 decreases when it accelerates toward high speeds. It can also be seen that acceleration is limited with a decrease in the power of the drive device 200.

However, as shown in FIG. 18B, when the reducer is provided as a variable reducer according to the present disclosure, it can be seen that the maximum output torque is kept constant due to the structure of the reducer as well as by the driving of the first driving module 221 and the second driving module 222 when it accelerates toward the high speeds.

Figure 19:
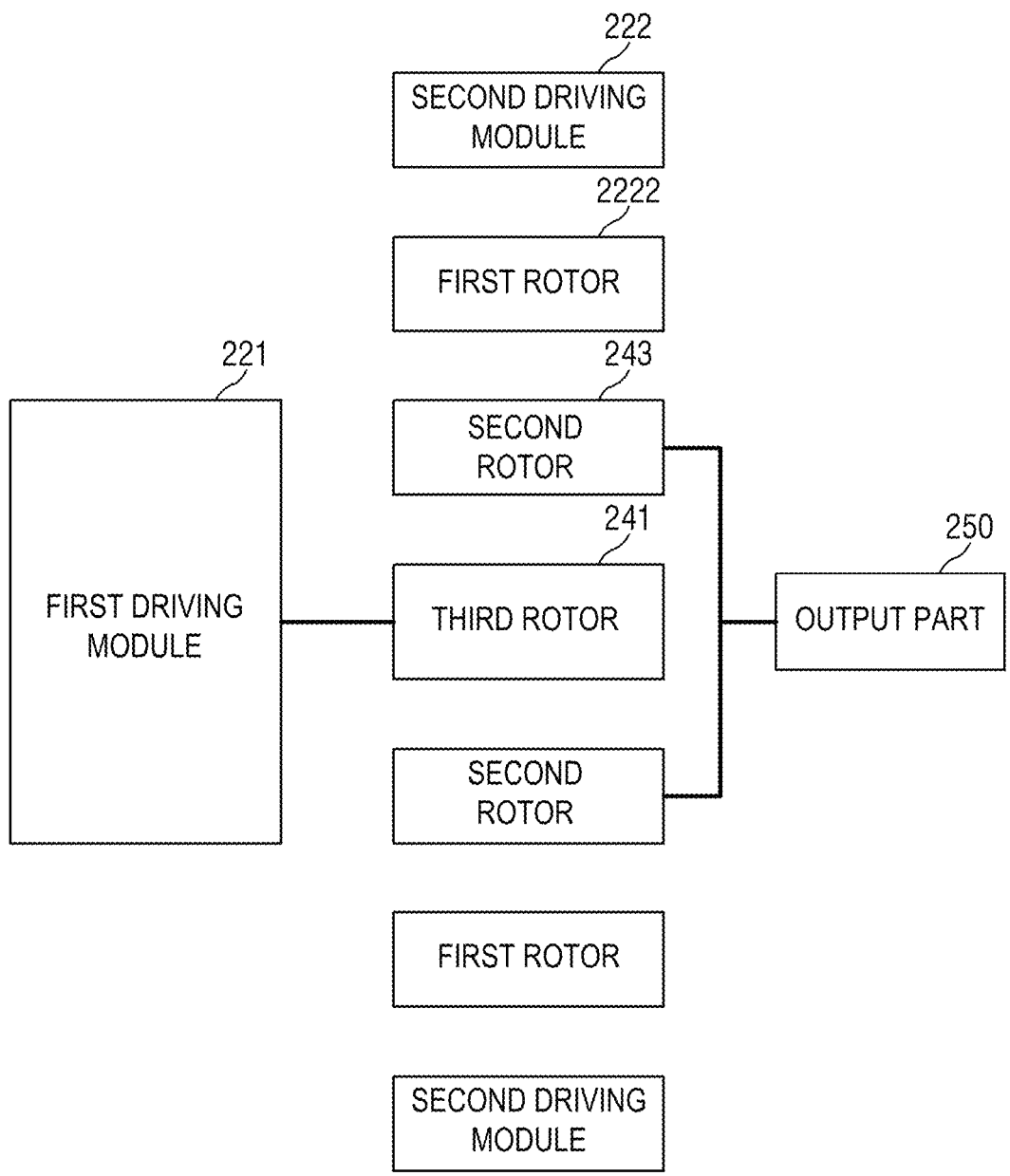
FIG. 19 is a view schematically showing an example of connection between a first driving module, a second driving module, and an output part in the vehicle drive device with the variable transmission according to the second exemplary embodiment of the present disclosure.
Figure 20:
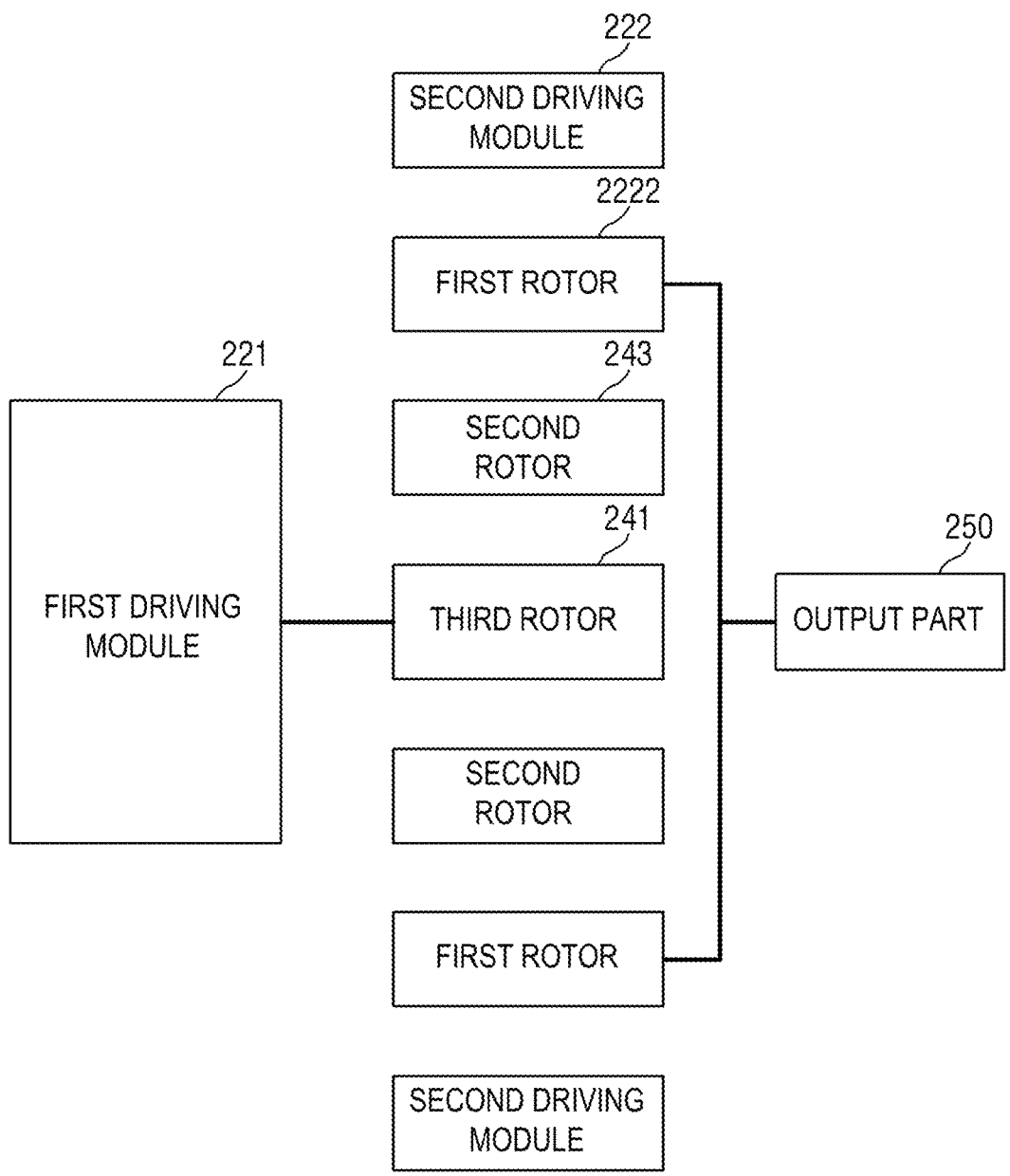
FIG. 20 is a view schematically showing another example of connection between the first driving module, the second driving module, and the output part in the vehicle drive device with the variable transmission according to the second exemplary embodiment of the present disclosure.
Figure 21:
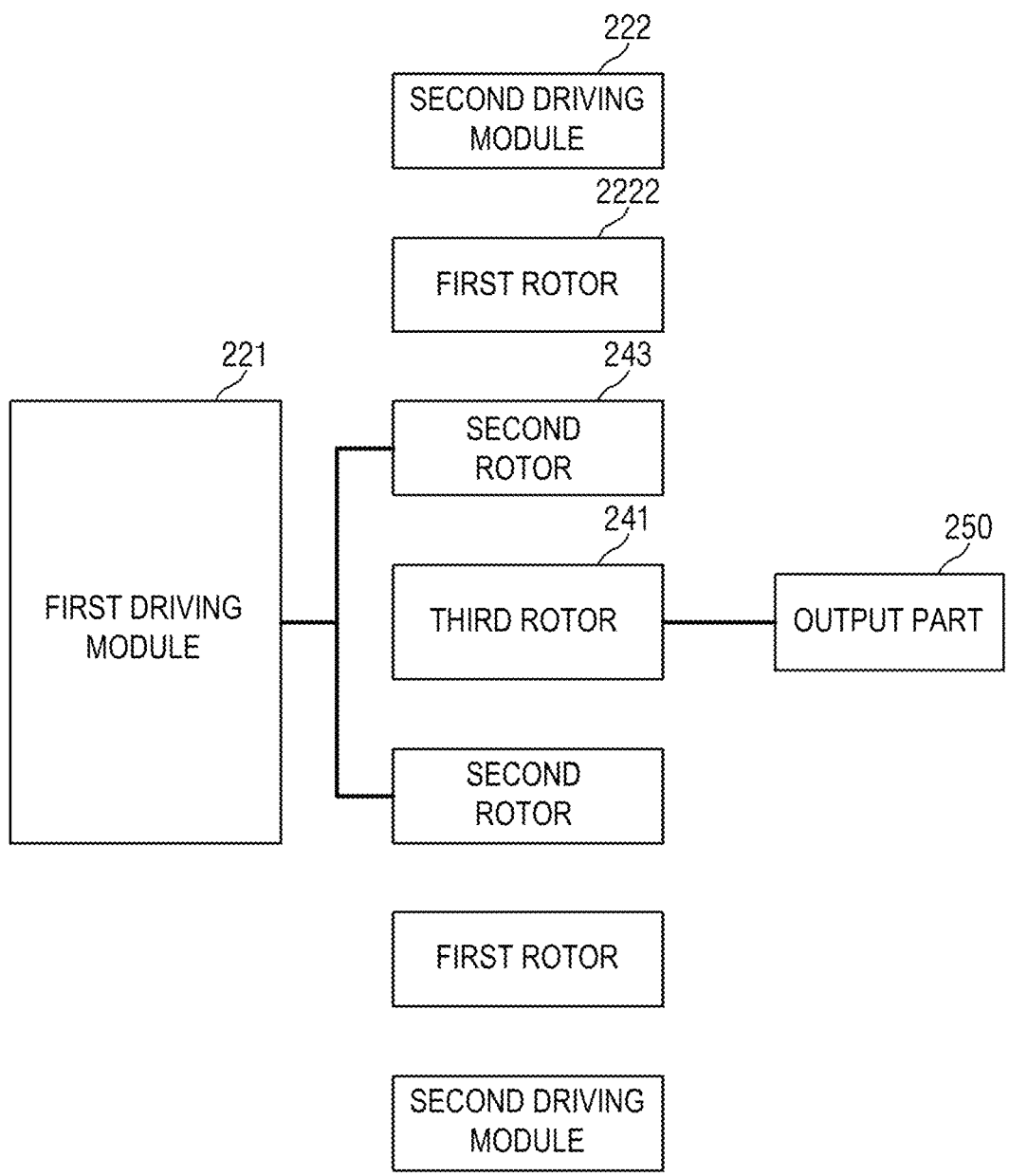
FIG. 21 is a view schematically showing another example of connection between the first driving module, the second driving module, and the output part in the vehicle drive device with the variable transmission according to the second exemplary embodiment of the present disclosure.

FIG. 19 is a view schematically showing an example of connection between the first driving module 221, the second driving module 222, and the output part 250 in the vehicle drive device 200 with the variable transmission according to the second exemplary embodiment of the present disclosure. FIG. 20 is a view schematically showing another example of connection between the first driving module 221, the second driving module 222, and the output part 250 in the vehicle drive device 200 with the variable transmission according to the second exemplary embodiment of the present disclosure. FIG. 21 is a view schematically showing another example of connection between the first driving module 221, the second driving module 222, and the output part 250 in the vehicle drive device 200 with the variable transmission according to the second exemplary embodiment of the present disclosure.

Referring to FIGS. 19 to 21, as described above, the input rotor 2212, the first rotor 2222, and the third rotor 241 may be provided in the second driving module 222. In this case, the output part 250 may be connected to one of the input rotor 2212, the first rotor 2222, or the third rotor 241.

For example, the output part 250 may be connected to the first rotor 2222 as shown in FIG. 19, may be connected to the input rotor 2212 as shown in FIG. 20, and may be connected to the third rotor 241 as shown in FIG. 21.

Further, the first driving module 221 may be connected to one of the input rotor 2212, and the first rotor 2222 or the third rotor 241 to which the output part 250 is not connected. For example, when the output part 250 is connected to the first rotor 2222 as shown in FIG. 19, the first driving module 221 may be connected to one of the input rotor 2212 or the first rotor 2222. Here, an example in which the first driving module 221 is connected to the third rotor 241 will be described below. Also, when the output part 250 is connected to the input rotor 2212 as shown in FIG. 20, the first driving module 221 may be connected to one of the first rotor 2222 or the third rotor 241. Here, an example in which the first driving module 221 is connected to the third rotor 241 will be described below. Also, when the output part 250 is connected to the first rotor 2222 as shown in FIG. 21, the first driving module 221 may be connected to one of the input rotor 2212 and the third rotor 241. Here, an example in which the first driving module 221 is connected to the first rotor 2222 will be described below.

In the second exemplary embodiment of the present disclosure, an example in which the output part 250 is connected to the first rotor 2222 and the first driving module 221 is connected to the third rotor 241 will be described below. However, as described above, the connection of the first driving module 221 and the connection of the output part 250 may be changed or modified freely.

As described above, for the drive device 200 with the coupling shown in FIG. 19, the first driving module 221 may be connected to the third rotor 241, the second driving module 222 may be connected to the input rotor 2212, and the first rotor 2222 may be connected to the output part 250.

Therefore, the rotational speed that is output from the first driving module 221 may be transferred to the third rotor 241 to control the second driving module 222 such that the rotational speed of the input rotor 2212 is controlled. The first rotor 2222 between the input rotor 2212 and the third rotor 241 may rotate due to magnetic force to transfer the rotation speed to the output part 250 and control the speed of the second driving module 222 such that the rotation speed of the output part 250 and the speed ratio of the reduction part are adjusted.

Also, as described above, for the drive device 200 with the coupling shown in FIG. 20, the first driving module 221 may be connected to the third rotor 241, the input rotor 2212 may be connected to the output part 250, and the first rotor 2222 may be electromagnetically connected to the second driving module 222 to control the rotational speed of the second driving module 222 such that the rotational speed of the output part 250 and the speed ratio of the reduction part are adjusted as in the exemplary embodiment.

Also, as described above, for the drive device 200 with the coupling shown in FIG. 21, the first driving module 221 may be connected to the first rotor 2222, the input rotor 2212 may be electromagnetically connected to the second driving module 222, and the third rotor 241 may be connected to the output part 250 to control the rotational speed of the second driving module 222 such that the rotational speed of the output part 250 and the speed ratio of the reduction part are adjusted as in the exemplary embodiment.

As in the exemplary embodiments described above with reference to FIGS. 19 to 21, the first driving module 221, the second driving module 222, and the output part 250 may be selectively connected to the input rotor 2212, the first rotor 2222, and the third rotor 241.

Also, in the second exemplary embodiment of the present disclosure, the drive device 200 with the above-described structure of FIG. 19 may be driven in the first mode in which both of the first driving module 221 and the second driving module 222 are driven or in the second mode in which only one of the first driving module 221 and the second driving module 222 is driven.

In addition, the drive device 200 with the coupling structures of FIGS. 19 to 21 may operate in the first mode in which both of the first driving module 221 and the second driving module 222 are driven and may also operate in the second mode in which only one of the first driving module 221 and the second driving module 222 is driven.

In the second mode, that is, when only one of the first driving module 221 and the second driving module 222 is fixed and the other is driven, the output part 250 may rotate at a fixed reduction ratio. For example, the drive device 200 with the structure of FIG. 19 will be described below as an example.

In the case of the drive device 200 with the structure of FIG. 19, when the first driving module 221 is fixed and only the second driving module 222 is driven, the second driving module 222 may provide a driving force through the input rotor 2212, and the third rotor 241 may be fixed. Thus, the rotational speed may be output at a particular reduction ratio. Here, an example in which the first driving module 221 is fixed and the second driving module 222 is driven has been described. However, when the second driving module 222 is fixed and the first driving module 221 is driven, the first driving module 221 may provide the driving force and output the rotational speed at a fixed ratio.

The second mode may also be used when one of the first driving module 221 or the second driving module 222 is inoperable due to a failure or malfunction or when a user selects the mode.

In the above structure of the present disclosure, the first driving module 221 and/or the second driving module 222 may be driven as a generator by generating electrical power through reverse driving. For example, the output part 250 may rotate by the rotation of a wheel, and the rotational force of the output part 250 may be applied to the first driving module 221 and the second driving module 222. The first driving module 221 and/or the second driving module 222 may receive the rotational force of the output part 250. Therefore, the rotational force of the output part 250 may be transferred to the first rotor 2222. Accordingly, the first driving module 221 and the second driving module 222 may be driven in a direction opposite to the driving direction in which the wheel is driven and thus can generate the electrical power.

In the vehicle drive device 200 with the structures of FIGS. 9 to 11, when a holding current is applied to the first driving module 221 and the second driving module 222, the first driving module 221 and the second driving module 222 may be fixed (e.g., held or locked). For example, when the first driving module 221 and the second driving module 222 are fixed, the input rotor 2212 and the third rotor 241 are fixed, and a magnetic field may be formed between the input rotor 2212 and the first rotor 2222.

When the output part 250 rotates while a magnetic field is formed between the input rotor 2212 and the first rotor 2222, the first rotor 2222 may rotate between the input rotor 2212 and the third rotor 241, and thus a slip torque may act due to the magnetic field formed between the input rotor 2212 and the third rotor 241 to apply a braking force. The rotational speed of the output part 250 may be decreased by the braking force. Also, the rotational speed of the output shaft may be decreased by varying the holding current acting on the first driving module 221 and the second driving module 222 to adjust the braking force.

The case in which a speed ratio is fixed, the case in which the driving module is driven as a generator, and the case in which braking force acts due to a holding current for the drive device 200 according to the second exemplary embodiment of the present disclosure as shown in FIG. 17 have been described above but may be similarly applied to the drive device 200 with the structure of FIG. 20 and the drive device 200 with the structure of FIG. 21.

Figure 22:
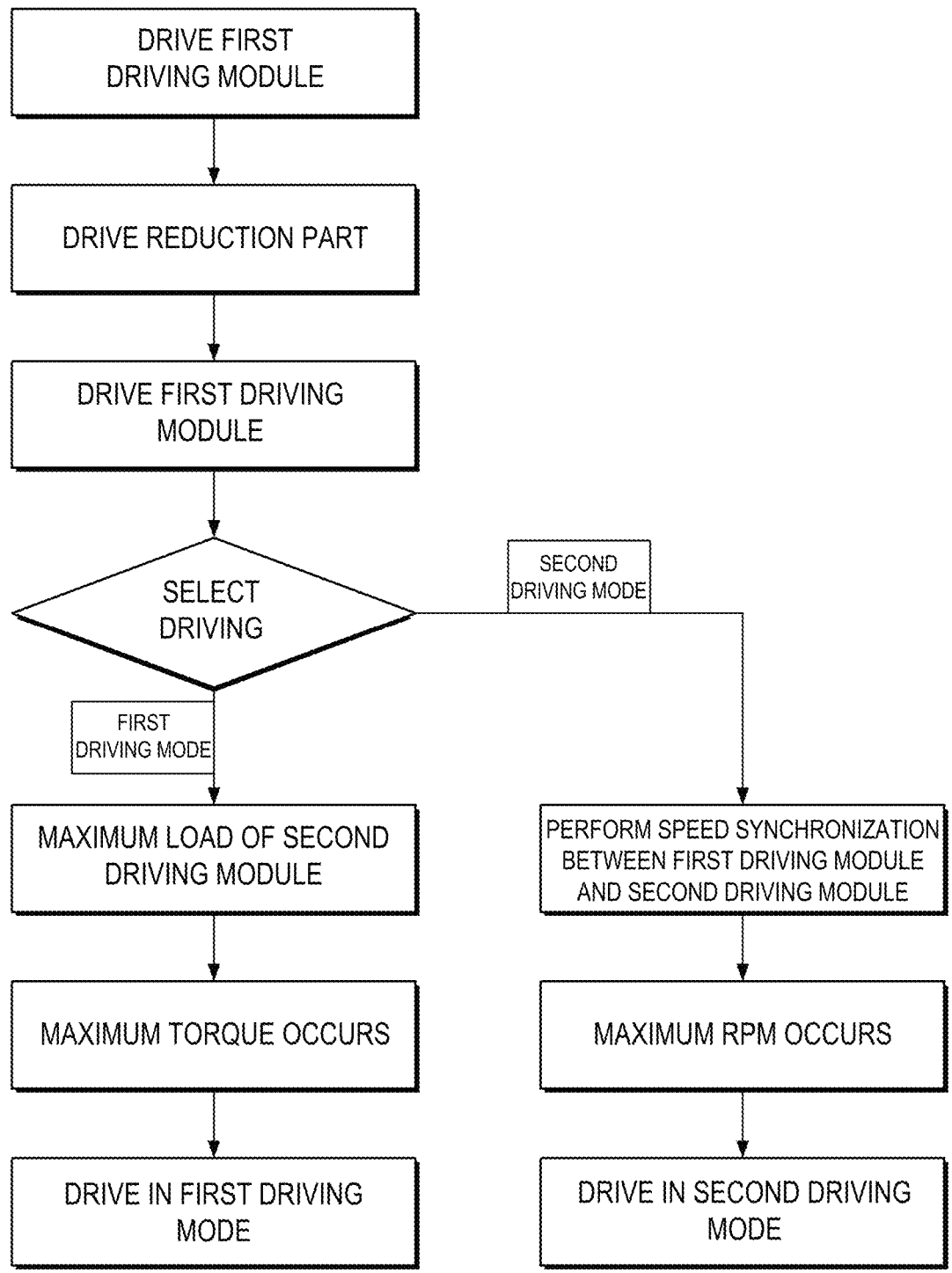
FIG. 22 is a flowchart illustrating the driving of the vehicle drive device with the variable transmission according to the second exemplary embodiment of the present disclosure.

FIG. 22 is a flowchart illustrating the driving of the vehicle drive device 200 with the variable transmission according to the second exemplary embodiment of the present disclosure. Referring to FIG. 22, the driving operation of the drive device 200 according to the second exemplary embodiment of the present disclosure may be described.

In general, a high torque is required for initial vehicle driving, and a high speed is required for fast driving. Accordingly, first, the control unit 290 may drive the first driving module 221 and the second driving module 222 via the control of the first inverter 291 and the second inverter 292.

The reduction part 240 may be driven by either driving the first driving module 221 or driving the second driving module 222. Accordingly, one of the first mode for initial vehicle driving or the second mode for fast driving may be selected.

When the driving part 220 is driven for initial vehicle driving, the first mode may be selected. When the first mode is selected, the maximum torque may be generated by maximally loading the second driving module 222 to implement the initial vehicle driving. Conversely, when the driving part 220 is driven for fast driving, the second mode may be selected. When the second mode is selected, the fast vehicle driving may be achieved by generating the maximum RPM by synchronizing the speeds of the first driving module 221 and the second driving module 222.

As described above, the drive device 200 according to the second exemplary embodiment of the present disclosure includes one reduction part 240 and a dual driving module using a coil and a magnet. The reduction part 240 may form and output a reduction ratio and have variable speed or fixed torque by including the first rotor 2222 including the fourth magnet 242, the pole piece module 243, and the third rotor 241 including the third magnet 241a. Thus, it is possible to stably maintain a constant high-speed output torque for both initial vehicle driving and fast driving.

With the vehicle drive device with the variable transmission according to an exemplary embodiment of the present disclosure, the motor may be designed with a smaller volume relative to output torque, and it is possible to save an arrangement space and to achieve weight-reduction and miniaturization.

Also, with the vehicle drive device with the variable transmission according to an exemplary embodiment of the present disclosure, it is possible to implement the consistent high torque band through the low and high RPMS.

Further, with the vehicle drive device with the variable transmission according to an exemplary embodiment of the present disclosure, it is possible to reduce noise and heterogeneity by applying a non-contact-type reducer rather than a contact-type reducer.

Also, the vehicle drive device with the variable transmission according to an exemplary embodiment of the present disclosure may include two motors. In a normal driving state, each motor may perform its function, i.e., an input motor may generate driving power, and a control motor may form a variable ratio. When one of the two motors fails, that is, when a problem occurs in one motor and, in particular, the first driving module (corresponding to the input motor), the vehicle may still operate only using the second driving module (corresponding to the control motor). Thus, it is possible to achieve safe driving.

In addition, with the vehicle driving device with the variable transmission according to an exemplary embodiment of the present disclosure, it is possible to implement an anti-lock braking system (ABS) function through the braking force due to the slip torque (detent torque) of a magnetic reducer. Accordingly, the braking force of a hydraulic brake may be dispersed, or there is no need to include a hydraulic brake. Thus, it is possible to maximize the utilization of the mounting space of an in-wheel system.

It should be noted that the advantageous effects of the present disclosure are not limited to the above-described effects, and other effects that are not described herein will be apparent to those skilled in the art from the above descriptions.

Many modifications and other embodiments of the disclosure will become apparent to one skilled in the art having the benefit of the teachings presented in the foregoing descriptions and the associated drawings. Therefore, it is understood that the disclosure is not to be limited to the specific exemplary embodiments disclosed, and that modifications and other embodiments are intended to be included within the scope of the appended claims.

What is claimed is:

1. A vehicle drive device with a variable transmission, the vehicle drive device comprising:
   a first driving module that provides a driving force;
   a second driving module that controls a transmission ratio;
   a housing in which the first driving module and the second driving module are accommodated;
   a transmission part comprising a first rotor, a second rotor, and a third rotor provided inside the second driving module; and an output part connected to one of the first rotor, the second rotor, and the third rotor, wherein the first driving module is connected to another one of the first rotor, the second rotor, and the third rotor that is not connected to the output part, wherein the second driving module is connected to yet another one of the first rotor, the second rotor, and the third rotor that is connected to neither the output part nor the first driving module, wherein two or more first bearings are disposed between the housing and a shaft part that receives rotation of the first driving module and forms a rotational axis of the second driving module, wherein two or more second bearings are provided on both sides of the shaft part on which the third rotor is coupled, and wherein two or more third bearings are provided between the housing and the first rotor and between the first rotor and the second rotor.

2. The vehicle drive device of claim 1, wherein the output part receives the rotation and outputs a rotational force changed in speed by the transmission part.

3. The vehicle drive device of claim 1, wherein the housing comprises:
 a first body part comprising a first body having one surface open in a first direction and a first cover configured to cover the first body; and
 a second body part comprising a second body located on the other surface of the first body and opened in a second direction opposite to the first direction and a second cover.

4. The vehicle drive device of claim 3, wherein the first driving module comprises:
 a first stator comprising a first stator core fixed to the first body and a plurality of first coils placed along an inner circumference of the first stator core; and
 an input rotor seated inside the first stator, coupled to the first stator to rotate around the shaft part, wherein a first magnet corresponding to the first coil is mounted in the input rotor.

5. The vehicle drive device of claim 4, wherein the second driving module comprises:
 a second stator comprising a second stator core fixed to the second body and a plurality of second coils placed along an inner circumference of the second stator core, and
 wherein the first rotor is seated inside the second stator, coupled to the second stator to rotate around the shaft part, wherein a second magnet corresponding to the second coil is mounted in the first rotor.

6. The vehicle drive device of claim 3, wherein the transmission part comprises:
 the third rotor inserted into and coupled to the shaft part, configured to rotate along with the rotation of the shaft part, wherein a third magnet is mounted in the third rotor; and
 a fourth magnet provided along an inner surface of the first rotor, and
 wherein the second rotor comprises a harmonic modulator of a magnetic body rotating at a rate that changes depending on magnetic flux transferred between the first rotor and the third rotor.

7. The vehicle drive device of claim 5, further comprising a control unit comprising a first inverter for controlling the first driving module and a second inverter for controlling the second driving module.

8. The vehicle drive device of claim 6, wherein a first hole is formed in the other surface of the first body,
 wherein a second hole connected to the first hole is formed in one surface of the second body, and
 wherein a second exposure hole through which the output part is exposed is formed in a second cover.

9. The vehicle drive device of claim 1, wherein the vehicle drive device operates:
 in a first mode in which both of the first driving module and the second driving module are driven; or in a second mode in which one of the first driving module or the second driving module is driven and the other is fixed.

10. A vehicle drive device with a variable transmission, the vehicle drive device comprising:
 a first driving module that provides a driving force;
 a second driving module that controls a transmission ratio;
 a transmission part comprising a first rotor, a second rotor, and a third rotor provided inside the second driving module; and
 an output part comprising a first protrusion that protrudes from the first rotor and a second protrusion that protrudes from the second rotor,
 wherein the third rotor is coupled to the first driving module to receive the driving force from the first driving module, and
 wherein each of the first protrusion and the second protrusion of the output part provides a rotational output, the transmission ratio of which is controlled by the second driving module.

\* \* \* \* \*